(12) United States Patent
Wang et al.

(10) Patent No.: US 11,686,841 B2
(45) Date of Patent: Jun. 27, 2023

(54) RADAR SYSTEM AND TERMINAL DEVICE

(71) Applicant: HUAWEI TECHNOLOGIES CO., LTD., Guangdong (CN)

(72) Inventors: Baopeng Wang, Shanghai (CN); Wei Jiang, Shanghai (CN); Sheng Zhao, Shanghai (CN); Zhenjun Ren, Nanjing (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 0 days.

(21) Appl. No.: 17/563,025

(22) Filed: Dec. 27, 2021

(65) Prior Publication Data

US 2022/0350019 A1 Nov. 3, 2022

Related U.S. Application Data

(63) Continuation of application No. PCT/CN2021/107467, filed on Jul. 20, 2021.

(30) Foreign Application Priority Data

Apr. 30, 2021 (CN) .......................... 202110485788.X

(51) Int. Cl.
*G01S 13/931* (2020.01)
*G01S 13/08* (2006.01)
(Continued)

(52) U.S. Cl.
CPC ............ *G01S 13/931* (2013.01); *G01S 13/04* (2013.01); *G01S 13/08* (2013.01); *H04B 7/0413* (2013.01); *G01S 7/0235* (2021.05)

(58) Field of Classification Search
CPC .......... G01S 7/032; G01S 7/03; G01S 7/4008; G01S 7/0235; G01S 7/023; G01S 13/931; G01S 13/87
(Continued)

(56) References Cited

U.S. PATENT DOCUMENTS 4,532,639 A * 7/1985 Price .......................... G01S 3/46
375/349
5,825,333 A 10/1998 Kudoh et al.
(Continued)

FOREIGN PATENT DOCUMENTS

CN 103941296 A 7/2014
CN 109061573 A 12/2018
(Continued)

OTHER PUBLICATIONS

Lei Sixiao, Computer Data Communication, Xidian University, 2006, with an English abstract, total 5 pages.

*Primary Examiner* — Erin F Heard
*Assistant Examiner* — Michael W Justice
(74) *Attorney, Agent, or Firm* — Gregg L. Jansen

(57) ABSTRACT

A radar system and a terminal device are provided. The radar system includes a controller and at least two radar modules directly or indirectly connected to the controller. The at least two radar modules include a first radar module and a second radar module, and the first radar module and the second radar module implement time division multiplexing of the controller in a digital domain. Compared with an existing radar system, the radar system in this application can provide more transmit channels, more receive channels, and a larger antenna array size when the two radar systems include a same quantity of controllers.

30 Claims, 10 Drawing Sheets

(51) Int. Cl.
*H04B 7/0413* (2017.01)
*G01S 13/04* (2006.01)
*G01S 7/02* (2006.01)

(58) Field of Classification Search
USPC .................................. 342/59, 175, 372, 70
See application file for complete search history.

(56) References Cited

U.S. PATENT DOCUMENTS

| | | | | |
|---|---|---|---|---|
| 6,169,379 | B1* | 1/2001 | Zhang | E05F 15/695 |
| | | | | 318/478 |
| 6,292,129 | B1* | 9/2001 | Matsugatani | G01S 13/345 |
| | | | | 342/107 |
| 7,038,633 | B2* | 5/2006 | Eriksson | H01Q 3/267 |
| | | | | 343/754 |
| 7,151,482 | B2* | 12/2006 | Natsume | G01S 13/343 |
| | | | | 342/368 |
| 7,280,068 | B2* | 10/2007 | Lee | G01S 7/2813 |
| | | | | 342/52 |
| 7,286,078 | B2* | 10/2007 | Mayer | G01S 13/931 |
| | | | | 342/195 |
| 7,289,058 | B2* | 10/2007 | Shima | H01Q 3/26 |
| | | | | 342/158 |
| 7,345,629 | B2* | 3/2008 | Dulmovits, Jr. | H01Q 21/0006 |
| | | | | 342/372 |
| 7,429,947 | B2* | 9/2008 | Shima | G01S 7/4021 |
| | | | | 342/174 |
| 7,486,223 | B2* | 2/2009 | Shima | H01Q 3/24 |
| | | | | 342/147 |
| 7,525,474 | B2* | 4/2009 | Carocari | G01S 13/785 |
| | | | | 342/30 |
| 7,817,081 | B2* | 10/2010 | Inoue | G01S 13/325 |
| | | | | 375/135 |
| 8,055,428 | B2* | 11/2011 | Okawa | G01C 21/00 |
| | | | | 701/96 |
| 8,547,273 | B2* | 10/2013 | Aoyagi | G01S 7/292 |
| | | | | 342/134 |
| 9,223,016 | B2* | 12/2015 | Kamimura | G01S 13/931 |
| 9,478,858 | B1* | 10/2016 | West | G01S 7/414 |
| 9,494,675 | B2* | 11/2016 | McCorkle | G01S 13/106 |
| 10,386,838 | B2* | 8/2019 | Kumakiri | B60W 40/09 |
| 10,514,703 | B2* | 12/2019 | Abe | G02B 27/0101 |
| 10,686,487 | B2* | 6/2020 | Kirkpatrick | H01Q 3/36 |
| 10,775,483 | B1 | 9/2020 | Kim et al. | |
| 10,812,154 | B1 | 10/2020 | Elad et al. | |
| 11,047,956 | B2* | 6/2021 | Elad | G01S 7/42 |
| 11,085,994 | B2* | 8/2021 | Roger | G01S 13/931 |
| 11,099,267 | B2* | 8/2021 | Wu | G01S 13/582 |
| 2005/0012658 | A1* | 1/2005 | Eriksson | H01Q 3/267 |
| | | | | 342/368 |
| 2005/0280572 | A1* | 12/2005 | Shima | H04B 7/0606 |
| | | | | 342/158 |
| 2006/0252382 | A1* | 11/2006 | Campbell | H04B 1/406 |
| | | | | 455/81 |
| 2007/0013575 | A1* | 1/2007 | Lee | G01S 13/89 |
| | | | | 342/194 |
| 2007/0052581 | A1* | 3/2007 | Shima | G01S 7/4021 |
| | | | | 342/174 |
| 2008/0147316 | A1* | 6/2008 | Okawa | G01C 21/00 |
| | | | | 701/96 |
| 2008/0158056 | A1* | 7/2008 | Shima | H04B 7/0814 |
| | | | | 342/377 |
| 2008/0238759 | A1* | 10/2008 | Carocari | G01S 13/785 |
| | | | | 342/47 |
| 2009/0073025 | A1* | 3/2009 | Inoue | G01S 13/931 |
| | | | | 342/175 |
| 2012/0326912 | A1* | 12/2012 | Aoyagi | G01S 7/292 |
| | | | | 342/21 |
| 2014/0022114 | A1* | 1/2014 | Kamimura | G01S 7/4021 |
| | | | | 342/134 |
| 2014/0313071 | A1* | 10/2014 | McCorkle | G01S 13/106 |
| | | | | 342/202 |
| 2017/0041038 | A1* | 2/2017 | Kirkpatrick | H04B 1/48 |
| 2017/0336797 | A1* | 11/2017 | Abe | G02B 27/0179 |
| 2017/0351256 | A1* | 12/2017 | Kumakiri | B60W 40/09 |
| 2018/0088221 | A1 | 3/2018 | Yomo et al. | |
| 2019/0129002 | A1* | 5/2019 | Roger | G01S 13/931 |
| 2019/0286127 | A1* | 9/2019 | Watanabe | B62D 6/008 |
| 2019/0293755 | A1* | 9/2019 | Cohen | H03M 9/00 |
| 2019/0383901 | A1* | 12/2019 | Elad | G01S 13/89 |
| 2020/0158861 | A1* | 5/2020 | Cattle | G01S 13/931 |
| 2020/0191940 | A1* | 6/2020 | Wu | H04B 7/0413 |
| 2020/0249343 | A1 | 8/2020 | Yu et al. | |
| 2020/0292663 | A1* | 9/2020 | Bai | G01S 13/931 |
| 2020/0304166 | A1* | 9/2020 | Kirkpatrick | H01Q 3/247 |
| 2021/0149043 | A1* | 5/2021 | Yu | G01S 13/584 |
| 2021/0156954 | A1* | 5/2021 | Rimini | H04J 1/05 |
| 2021/0263147 | A1* | 8/2021 | Bauer | G01S 13/584 |
| 2021/0293923 | A1* | 9/2021 | Arkind | G01S 7/4017 |
| 2021/0293926 | A1* | 9/2021 | Elad | G01S 7/285 |

FOREIGN PATENT DOCUMENTS

| | | |
|---|---|---|
| CN | 109116375 A | 1/2019 |
| CN | 109600167 A | 4/2019 |
| CN | 109901150 A | 6/2019 |
| CN | 110068806 A | 7/2019 |
| CN | 110297217 A | 10/2019 |
| CN | 210742494 U | 6/2020 |
| CN | 112166561 A | 1/2021 |
| CN | 212751909 U | 3/2021 |
| EP | 3418768 A1 | 12/2018 |
| KR | 101356169 B1 | 1/2014 |
| WO | 2020188028 A1 | 9/2020 |

* cited by examiner

RADAR SYSTEM AND TERMINAL DEVICE

CROSS-REFERENCE TO RELATED APPLICATIONS

This application is a continuation of International Application No. PCT/CN2021/107467, filed on Jul. 20, 2021, which claims priority to Chinese Patent Application No. 202110485788.X, filed on Apr. 30, 2021. The disclosures of the aforementioned applications are hereby incorporated by reference in their entireties.

TECHNICAL FIELD

This application relates to the field of communications technologies, and in particular, to a radar system and a terminal device.

BACKGROUND

A radar system is an important sensor in the field of vehicle-mounted sensing, and is widely used in advanced driver assistance systems (advanced driver assistance systems, ADASs). As application scenarios of automated driving become increasingly complex, the ADAS gradually has a higher requirement for performance of a forward radar, especially for counters such as a maximum detection distance, angular resolution of azimuth, and angular resolution of a pitching dimension. These counters are closely related to a quantity of channels in the radar, an antenna array size, and the like. To improve the performance of the forward radar, a solution of cascading a plurality of monolithic microwave integrated circuits (monolithic microwave integrated circuits, MMICs) at a radio frequency front-end of a radar system is used in the conventional technology, to implement a larger quantity of channels and a larger antenna array size. In this manner, the radar system requires more microcontroller units (MCUs) that include intermediate frequency data interfaces. However, a quantity of transmit channels integrated in an MMIC chip, a quantity of receive channels integrated in the MMIC chip, and a quantity of intermediate frequency data interfaces supported by the MCU are fixed, and quantities of MMIC chips and MCU chips that are required in the multi-chip cascading solution are also fixed. Therefore, system performance counters of the radar system are basically determined. To continue to increase a quantity of radio frequency channels and the antenna array size, additional MMICs and MCUs need to be added. However, this brings a huge challenge to a size, costs, power consumption, and the like of the radar system.

SUMMARY

This application provides a radar system and a terminal device, to improve performance of the radar system.

The radar system in this application may also be referred to as a radar, a detection apparatus, a detection device, or the like.

According to a first aspect, a radar system is provided. The radar system includes a controller and at least two radar modules directly or indirectly connected to the controller. The at least two radar modules include a first radar module and a second radar module, and the first radar module and the second radar module implement time division multiplexing of the controller in digital domain. For example, the radar module in this application may be a monolithic microwave integrated circuit (MMIC), and the controller in this application may be a microcontroller unit (MCU).

The time division multiplexing in this application is time division multiplexing in digital domain. To be specific, time division switching is performed on a digital signal. The digital signal is obtained after analog and digital conversion by the radar module, to implement time division multiplexing of the controller.

It can be learned that, compared with a radar system in the conventional technology, the radar system in this application can provide more transmit channels, more receive channels, and a larger antenna array size when the two radar systems include a same quantity of controllers. In this way, a maximum detection distance, an unambiguous angle range, and angular resolution can be increased, flexible arrangement of an antenna array and optimization of a signal processing system solution are made possible, and cabling complexity and an insertion loss of a feeder connecting an antenna to the radar module are reduced, so that performance of the radar system is improved, and a size, power consumption, costs, and the like of the radar system are reduced.

In an implementation, the time division multiplexing is module-level time division multiplexing. In this case, the at least two radar modules connected to the controller multiplex the controller through the module-level time division multiplexing, to adapt to an antenna array arrangement solution and an algorithm solution, and help reduce cabling complexity and an insertion loss of a feeder connecting an antenna to the radar module. Optionally, when the first radar module or the second radar module is a chip, the module-level time division multiplexing may also be referred to as chip-level time division multiplexing.

In an implementation, the time division multiplexing is channel-level time division multiplexing. In this case, the at least two radar modules connected to the controller multiplex the controller through the channel-level time division multiplexing. The channel-level time division multiplexing makes multiplexing more flexible and provides a higher degree of freedom for multiplexing, to better adapt to an antenna array arrangement solution and an algorithm solution, and help reduce cabling complexity and an insertion loss of a feeder connecting an antenna to the radar module.

In an implementation, the time division multiplexing is implemented by using software. Therefore, the time division multiplexing can be implemented without a need to add additional hardware or change a hardware structure. The time division multiplexing implemented by using software in this application may also be referred to as time division multiplexing implemented by using a software module (a software structure), or may be referred to as time division multiplexing implemented through software control.

In an implementation, the time division multiplexing is implemented by using hardware. The hardware for implementing the time division multiplexing may be disposed between the radar module and the controller, may be disposed on the radar module, or may be disposed on the controller. Therefore, the time division multiplexing can be implemented by inserting a hardware module into the radar module, without a need to design additional software control. The time division multiplexing implemented by using hardware in this application may also be referred to as time division multiplexing implemented by using a hardware module (a hardware structure), or may be referred to as time division multiplexing implemented through hardware control.

In an implementation, the first radar module includes a first interface, the second radar module includes a second interface, and the controller includes a third interface. When the first radar module is electrically connected to the third interface of the controller by using the first interface, the second interface of the second radar module is in a high-impedance state; or when the second radar module is electrically connected to the third interface of the controller by using the second interface, the first interface is in a high-impedance state. Therefore, the module-level time division multiplexing of the controller can be implemented by controlling statuses of the interfaces of the first radar module and the second radar module. When the first radar module or the second radar module is a chip, the module-level time division multiplexing may also be referred to as chip-level time division multiplexing.

It can be learned that, in this embodiment of this application, through software control, the second interface of the second radar module is in a high-impedance state when the first radar module is connected to the third interface of the controller by using the first interface, in other words, when the first radar module is electrically connected to the controller, the second radar module is connected to the controller but cannot transmit a signal. In this way, the module-level time division multiplexing is implemented.

Optionally, when the first interface includes a plurality of channel interfaces, and the second interface includes a plurality of channel interfaces, when the first radar module is electrically connected to the third interface of the controller by using at least one channel interface in the first interface, all the channel interfaces in the second interface of the second radar module are in a high-impedance state; or when the first radar module is electrically connected to the third interface of the controller by using at least one channel interface in the first interface, some of the channel interfaces in the second interface of the second radar module are in a high-impedance state. Each channel interface in this application corresponds to each channel, and the channel in this application may correspond to a radio frequency channel or a baseband processing channel.

It can be learned that in this implementation solution, statuses of all the channel interfaces of the first radar module and statuses of all the channel interfaces of the second radar module are controlled by using software, to implement the channel-level time division multiplexing of the controller.

Optionally, when the first interface of the first radar module includes a plurality of channel interfaces, when the first radar module is electrically connected to the third interface of the controller by using a first part of the channel interfaces in the first interface, a second part of the channel interfaces in the first interface of the first radar module are in a high-impedance state. Each channel interface in this application corresponds to each channel, and the channel in this application may correspond to a radio frequency channel or a baseband processing channel.

It can be learned that the first radar module can alternatively implement the channel-level time division multiplexing of the controller independently.

In an implementation, the time division multiplexing implemented by using hardware includes time division multiplexing implemented by using a transit module. The radar system further includes the transit module. The first radar module and the second radar module are separately connected to the controller by using the transit module, to implement the time division multiplexing.

It can be learned that in this implementation solution, the first radar module and the second radar module are separately connected to the controller by using the transit module, to implement the time division multiplexing through hardware control.

In an implementation, when the first radar module is electrically connected to the controller by using the transit module, the second radar module is disconnected from the transit module; or when the second radar module is electrically connected to the controller by using the transit module, the first radar module is disconnected from the transit module. In this way, the module-level time division multiplexing of the controller is implemented by using the transit module.

Optionally, the first radar module includes a plurality of channels, and the second radar module includes a plurality of channels. When at least one channel of the first radar module is electrically connected to the controller by using the transit module, all the channels of the second radar module are disconnected from the transit module; or when at least one channel of the first radar module is electrically connected to the controller by using the transit module, some of the channels of the second radar module are disconnected from the transit module; or when at least one channel of the first radar module is electrically connected to the controller by using the transit module, one part of the channels of the second radar module are disconnected from the transit module, and the one part of the channels of the second radar module are electrically connected to the controller. In this way, some or all of the channels of the first radar module and some or all of the channels of the second radar module are separately connected to or disconnected from the controller by using the transit module, to implement the channel-level time division multiplexing of the controller through hardware control. The channel in this application may correspond to a radio frequency channel or a baseband processing channel.

Optionally, the first radar module includes a plurality of channels. When a first part of the channels of the first radar module are electrically connected to the controller by using the transit module, a second part of the channels of the first radar module are disconnected from the transit module. The channel in this application may correspond to a radio frequency channel or a baseband processing channel.

It can be learned that the first radar module can alternatively implement the channel-level time division multiplexing of the controller independently. In other words, a single radar module can implement the channel-level time division multiplexing of the controller.

In an implementation, the transit module is a logic chip or a multiplexer. Therefore, a module-level or channel-level time division multiplexing solution can be flexibly implemented. If the transit module is a logic chip, switchover between a plurality of modes can be supported, and the time division multiplexing solution can be implemented more flexibly. If the transit module is a multiplexer, more costs can be reduced.

In an implementation, the radar system in this application may include radar modules corresponding to different antenna arrays. For example, the radar system includes the first radar module and the second radar module. The radar system further includes a first antenna array corresponding to the first radar module and a second antenna array corresponding to the second radar module.

It can be learned that the antenna arrays of the radar modules in the radar system in this application may be different or same antenna arrays. Therefore, the antenna arrays may be designed according to an actual requirement, and the antenna arrays of the radar modules may be designed flexibly and individually.

Optionally, the radar system in this application may alternatively be a radar system in which a plurality of radar modules share a same antenna array. For example, the radar system includes the first radar module and the second radar module. The radar system further includes a third antenna array, and the first radar module and the second radar module are separately connected to the third antenna array.

It can be learned that the antenna arrays of the radar modules in the radar system in this application can be multiplexed, so that a quantity of antenna arrays is reduced, and design complexity of the radar system is further reduced.

In an implementation, the first radar module and the second radar module may be different radar modules, so that different radar modules can multiplex a same controller, controllers are saved, and costs are reduced.

In an implementation, the radar system further includes a third radar module, and the third radar module includes at least one channel. The third radar module is electrically connected to the controller, or the at least one channel of the third radar module is electrically connected to the controller. When the third radar module is electrically connected to the controller, the third radar module, the first radar module, and the second radar module can implement partial time division multiplexing of the third interface of the controller. When the at least one channel of the third radar module is electrically connected to the controller, the third radar module, the first radar module, and the second radar module can implement partial time division multiplexing of the third interface of the controller.

It can be learned that, in this embodiment of this application, not only the first radar module or the second radar module implementing the time division multiplexing of the controller but also the third radar module directly and electrically connected to the controller are included, so that better compatibility with an existing radar system can be implemented.

In an implementation, any interface of the controller is a low voltage differential signal (low voltage differential signal, LVDS) interface or a mobile industry processor interface (mobile industry processor interface, MIPI) interface.

In an implementation, the radar system is a vehicle-mounted radar system.

According to a second aspect, a terminal device is provided. The terminal device includes the radar system according to any of the forgoing implementations. For example, the terminal device may be a vehicle.

DESCRIPTION OF EMBODIMENTS

To make objectives, technical solutions, and advantages of this application clearer, the following further describes this application in detail with reference to accompanying drawings.

The following describes some terms in the embodiments of this application, to facilitate understanding of a person skilled in the art.

(1) A radar, also referred to as a radar apparatus, usually operates on an ultra short wave band or a microwave band. A radar operating on the ultra short wave band is referred to as an ultra short wave radar, and a radar operating on the microwave band is usually referred to as a microwave radar. Sometimes, the microwave radar is further subdivided into a decimeter wave radar, a centimeter wave radar, a millimeter wave radar, and the like. A working principle of the radar is to detect a corresponding target object by using a transmitted signal (or referred to as a detection signal) and receiving a reflected signal that is reflected by the target object.

Figure 1:
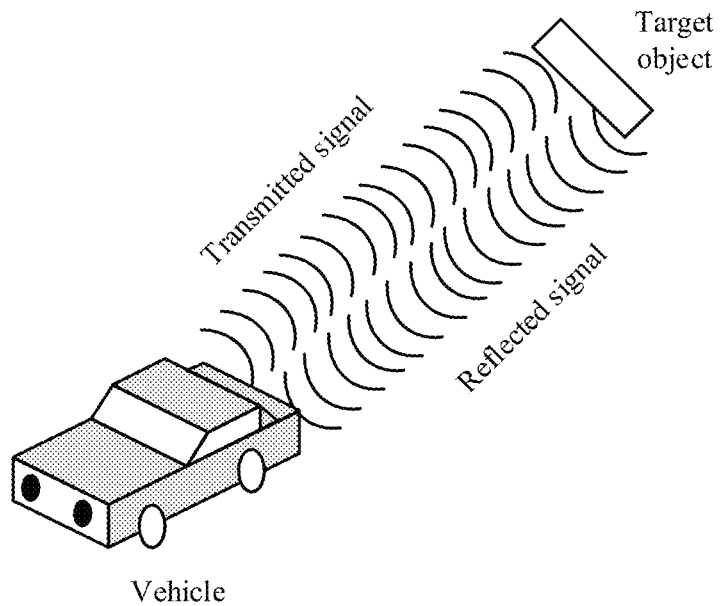
FIG. 1 is a diagram of a principle for detecting a target object by a radar.

FIG. 1 is a diagram of a principle for detecting a target object by a radar. The radar transmits a detection signal (an electromagnetic wave) (which may also be referred to as a transmit signal) by using a transmit antenna, receives, by using a receive antenna, a signal (which may also be referred to as an echo signal) reflected by the target object, and performs processing such as amplification and down-conversion on the signal reflected by the target object, to obtain information such as a relative distance and a relative speed between a vehicle and the target object. In this way, a location of the target object is determined.

(2) A target object may be any target for which a distance and/or a speed needs to be measured, and may be, for example, a moving object or a stationary object.

(3) "At least one" means one or more, "at least two" means two or more, and "a plurality of" means two or more. The term "and/or" describes an association relationship between associated objects, and indicates that three relationships may exist. For example, A and/or B may indicate the following cases: Only A exists, both A and B exist, and only B exists, where A and B may be singular or plural. The character "/" generally indicates an "or" relationship between the associated objects. "At least one of the following items (pieces)" or a similar expression thereof means any combination of these items, including any combination of singular items (pieces) or plural items (pieces). For example, at least one of a, b, or c may indicate a, b, c, a and b, a and c, b and c, or a, b, and c, where a, b, and c may be singular or plural.

In addition, unless otherwise stated, ordinal numbers such as "first" and "second" in the embodiments of this application are used to distinguish between a plurality of objects, and are not intended to limit a sequence, a time sequence, priorities, or importance of the plurality of objects. For example, a third interface and a first interface are used only for distinguishing between different interfaces, and do not indicate that priorities, sequences, importance, or the like of the two interfaces are different.

For a problem described in the background, two solutions are provided. In one solution, a switch may be added between an antenna and a transmitting/receiving processing module to implement time division multiplexing of the transmitting/receiving processing module, but system integration is relatively poor in this solution. In the other solution, a time division multiplexing technology of a radio frequency channel or an intermediate frequency analog channel in a chip may be used to increase a quantity of channels and enlarge an antenna array, but because the time division multiplexing technology in this solution is implemented inside the chip, a radar system is limited to an on-board-level position of the chip, and further, an antenna array solution or a radar signal processing algorithm solution is limited. Especially in cascaded radars in which an RF channel or an ANA (Analog) channel implementing time division multiplexing are integrated in a plurality of MMIC chips, to implement flexible arrangement of the antenna array, the complexity of a layout of an RF feeder cable is increased, and in addition, a relatively long feeder introduces a relatively large insertion loss, and partial performance of the system is sacrificed.

In view of this, an embodiment of this application provides a radar system. For example, the radar system may be a vehicle-mounted radar system.

The radar system provided in this embodiment of this application may include a controller and at least two radar modules directly or indirectly connected to the controller. The at least two radar modules include a first radar module and a second radar module, and the first radar module and the second radar module implement time division multiplexing of the controller in digital domain.

In this embodiment of this application, the radar module may be a radar chip. The radar chip is, for example, an MMIC chip. Details are not described below again.

The time division multiplexing in this application is time division multiplexing in digital domain. To be specific, time division switching is performed on a digital signal that is of the radar module and that undergoes digital-to-analog conversion, to implement time division multiplexing of the controller.

In an implementation, the time division multiplexing is module-level time division multiplexing. In this case, the at least two radar modules connected to the controller multiplex the controller through the module-level time division multiplexing, to adapt to an antenna array arrangement solution and an algorithm solution, and help reduce cabling complexity and an insertion loss of a feeder connecting an antenna to the radar module. Optionally, when the first radar module or the second radar module is a chip, the module-level time division multiplexing may also be referred to as chip-level time division multiplexing.

In another implementation, the time division multiplexing is channel-level time division multiplexing. In this case, the at least two radar modules connected to the controller multiplex the controller through the channel-level time division multiplexing. The channel-level time division multiplexing makes multiplexing more flexible and provides a higher degree of freedom for multiplexing, to better adapt to an antenna array arrangement solution and an algorithm solution, and help reduce cabling complexity and an insertion loss of a feeder connecting an antenna to the radar module.

In still another implementation, the time division multiplexing is implemented by using software. Therefore, the time division multiplexing can be implemented without a need to add additional hardware or change a hardware structure. The time division multiplexing implemented by using software in this application may also be referred to as time division multiplexing implemented by using a software module (a software structure), or may be referred to as time division multiplexing implemented through software control.

In still another implementation, the time division multiplexing is implemented by using hardware. Therefore, the time division multiplexing can be implemented by inserting a hardware module into the radar module, without a need to design additional software control. The hardware for implementing the time division multiplexing may be disposed between the radar module and the controller, may be disposed on the radar module, or may be disposed on the controller. In this embodiment of this application, as an example for description, the hardware for implementing the time division multiplexing is disposed between the radar module and the controller. The time division multiplexing implemented by using hardware in this application may also be referred to as time division multiplexing implemented by using a hardware module (a hardware structure), or may be referred to as time division multiplexing implemented through hardware control.

In an implementation, the first radar module includes a first interface, the second radar module includes a second interface, and the controller includes a third interface. When the first radar module is electrically connected to the third interface of the controller by using the first interface, the second interface of the second radar module is in a high-impedance state; or when the second radar module is electrically connected to the third interface of the controller by using the second interface, the first interface is in a high-impedance state. Therefore, the module-level time division multiplexing of the controller can be implemented by controlling statuses of the interfaces of the first radar module and the second radar module. When the first radar module or the second radar module is a chip, the module-level time division multiplexing may also be referred to as chip-level time division multiplexing.

It can be learned that, in this embodiment of this application, through software control, the second interface of the second radar module is in a high-impedance state when the first radar module is connected to the third interface of the controller by using the first interface, in other words, when the first radar module is electrically connected to the controller, the second radar module is connected to the controller but cannot transmit a signal. In this way, the module-level time division multiplexing is implemented.

Optionally, when the first interface includes a plurality of channel interfaces, and the second interface includes a plurality of channel interfaces, when the first radar module is electrically connected to the third interface of the controller by using at least one channel interface in the first interface, all the channel interfaces in the second interface of the second radar module are in a high-impedance state; or when the first radar module is electrically connected to the third interface of the controller by using at least one channel interface in the first interface, some of the channel interfaces in the second interface of the second radar module are in a high-impedance state. Each channel interface in this application corresponds to each channel, and the channel in this application may correspond to a radio frequency channel or a baseband processing channel.

It can be learned that in this implementation solution, statuses of all the channels of the first radar module and statuses of all the channels of the second radar module are controlled by using software, to implement the channel-level time division multiplexing of the controller.

Optionally, when the first interface of the first radar module includes a plurality of channel interfaces, when the first radar module is electrically connected to the third interface of the controller by using a first part of the channel interfaces in the first interface, a second part of the channel interfaces in the first interface of the first radar module are in a high-impedance state. Each channel interface in this application corresponds to each channel, and the channel in this application may correspond to a radio frequency channel or a baseband processing channel.

It can be learned that the first radar module can alternatively implement the channel-level time division multiplexing of the controller independently.

In an implementation, the time division multiplexing implemented by using hardware includes time division multiplexing implemented by using a transit module. The radar system further includes the transit module. The first radar module and the second radar module are separately connected to the controller by using the transit module, to implement the time division multiplexing.

It can be learned that in this implementation solution, the first radar module and the second radar module are separately connected to the controller by using the transit module, to implement the time division multiplexing through hardware control.

In an implementation, when the first radar module is electrically connected to the controller by using the transit module, the second radar module is disconnected from the transit module; or when the second radar module is electrically connected to the controller by using the transit module, the first radar module is disconnected from the transit module. In this way, the module-level time division multiplexing of the controller is implemented by using the transit module.

Optionally, the first radar module includes a plurality of channels, and the second radar module includes a plurality of channels. When at least one channel of the first radar module is electrically connected to the controller by using the transit module, all the channels of the second radar module are disconnected from the transit module; or when at least one channel of the first radar module is electrically connected to the controller by using the transit module, some of the channels of the second radar module are disconnected from the transit module; or when at least one channel of the first radar module is electrically connected to the controller by using the transit module, one part of the channels of the second radar module are disconnected from the transit module, and the one part of the channels of the second radar module are electrically connected to the controller. In this way, some or all of the channels of the first radar module and some or all of the channels of the second radar module are separately connected to or disconnected from the controller by using the transit module, to implement the channel-level time division multiplexing of the controller through hardware control. The channel in this application may correspond to a radio frequency channel or a baseband processing channel.

Optionally, the first radar module includes a plurality of channels. When a first part of the channels of the first radar module are electrically connected to the controller by using the transit module, a second part of the channels of the first radar module are disconnected from the transit module. The channel in this application may correspond to a radio frequency channel or a baseband processing channel.

It can be learned that the first radar module can alternatively implement the channel-level time division multiplexing of the controller independently. In other words, a single radar module can implement the channel-level time division multiplexing of the controller.

In an implementation, the transit module is a logic chip or a multiplexer. Therefore, a module-level or channel-level time division multiplexing solution can be flexibly implemented. If the transit module is a logic chip, switchover between a plurality of modes can be supported, and the time division multiplexing solution can be implemented more flexibly. If the transit module is a multiplexer, more costs can be reduced.

In an implementation, the radar system in this application may include radar modules corresponding to different antenna arrays. For example, the radar system includes the first radar module and the second radar module. The radar system further includes a first antenna array corresponding to the first radar module and a second antenna array corresponding to the second radar module.

It can be learned that the antenna arrays of the radar modules in the radar system in this application may be different or same antenna arrays. Therefore, the antenna arrays may be designed according to an actual requirement, and the antenna arrays of the radar modules may be designed flexibly and individually.

Optionally, the radar system in this application may alternatively be a radar system in which a plurality of radar modules share a same antenna array. For example, the radar system includes the first radar module and the second radar module. The radar system further includes a third antenna array, and the first radar module and the second radar module are separately connected to the third antenna array.

It can be learned that the antenna arrays of the radar modules in the radar system in this application can be multiplexed, so that a quantity of antenna arrays is reduced, and design complexity of the radar system is further reduced.

In an implementation, the first radar module and the second radar module may be different radar modules, so that different radar modules can multiplex a same controller, controllers are saved, and costs are reduced.

In an implementation, the radar system further includes a third radar module, and the third radar module includes at least one channel. The third radar module is electrically connected to the controller, or the at least one channel of the third radar module is electrically connected to the controller.

When the third radar module is electrically connected to the controller, the third radar module, the first radar module, and the second radar module can implement partial time division multiplexing of the third interface of the controller. When the at least one channel of the third radar module is electrically connected to the controller, the third radar module, the first radar module, and the second radar module can implement partial time division multiplexing of the third interface of the controller.

It can be learned that, in this embodiment of this application, not only the first radar module or the second radar module implements the time division multiplexing of the controller but also the third radar module directly and electrically connected to the controller are included, so that better compatibility with an existing radar system can be implemented.

In this embodiment of this application, the time division multiplexing may be implemented in a plurality of manners. The following separately describes a module-level time division multiplexing manner and a channel-level time division multiplexing manner. For details, refer to the following implementation A and implementation B.

In the implementation A, a manner of the time division multiplexing is the module-level time division multiplexing manner.

In the implementation A, the first interface of the first radar module and the second interface of the second radar module are separately connected to the third interface of the controller. A first digital signal of the first radar module and a second digital signal of the second radar module are transmitted to the third interface of the controller in a time division multiplexing manner.

Figure 2:
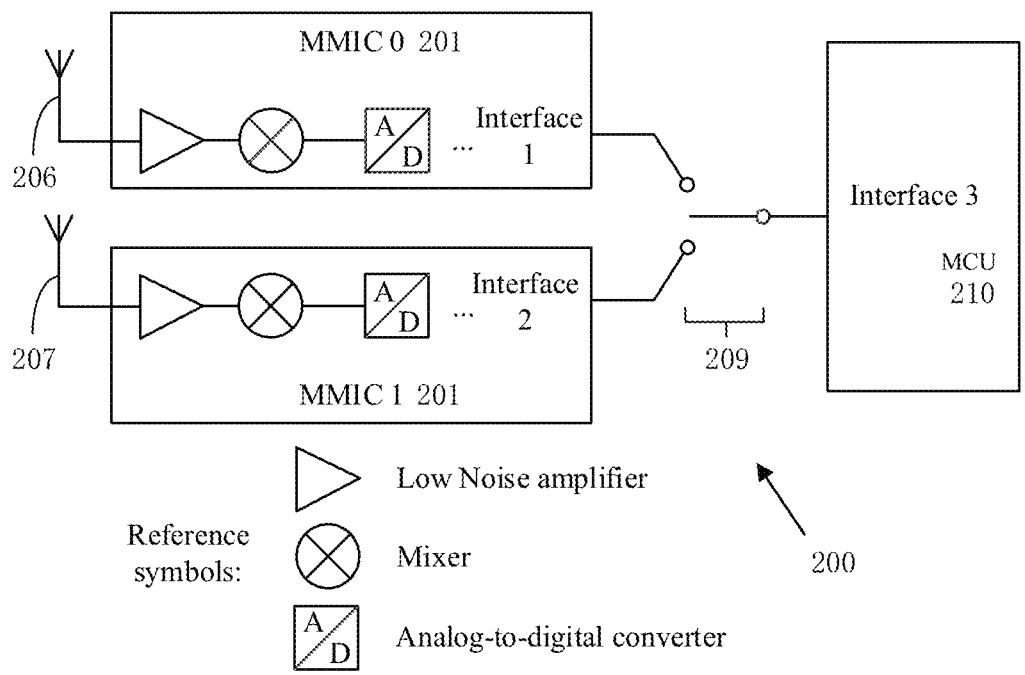
FIG. 2 is a diagram of a radar system according to an embodiment of this application.

FIG. 2 is a schematic diagram of a radar system 200 according to an embodiment of this application. As shown in FIG. 2, the radar system 200 includes a microcontroller unit (MCU) or controller 210 and two radar modules. The two radar modules are an MMIC 0 201 and an MMIC 1 202. The radar system 200 may further include an antenna array 206 or 207 connected to each radar module. The antenna array 206 or 207 may include a receive antenna and a transmit antenna. The transmit antenna is configured to transmit a signal to a target object, and the receive antenna is configured to receive an echo signal transmitted or reflected by the target object.

FIG. 2 shows an example in which the radar modules include a low noise amplifier (LNA), a mixer, and an analog and digital converter (ADC). The amplifier is configured to, after the receive antenna receives the signal transmitted or reflected by the target object, perform power amplification on the received signal; or before the transmit antenna transmits the signal, perform power amplification on the signal to be transmitted. The mixer is configured to perform down-conversion on the signal received by the receive antenna to select a frequency component related to the target object. The ADC is configured to perform analog and digital conversion on the signal on which the mixer performs the down-conversion. The radar module may further include an interface for being connected to an interface of the MCU 210. As shown in FIG. 2, an interface 1 of the MMIC 0 201 and an interface 2 of the MMIC 1 202 are separately connected to an interface 3 of the MCU 210.

In this embodiment of this application, each radar module may include but is not limited to one of or a combination of a plurality of the low noise amplifier, the mixer, and the analog and digital converter shown in FIG. 2, and may further include another component. The MMIC 0 201 is used as an example. For example, a filter or another component may be further included between an ADC and the interface 1 in the MMIC 0 201. The filter is, for example, a high-pass filter (HPF) or a low-pass filter (LPF). Examples are not listed herein one by one.

It should be noted that FIG. 2 shows an example in which the interface 1 of the MMIC 0 201 and the interface 2 of the MMIC 1 202 are separately connected to the MCU 210 by using one single-pole double-throw switch 209. The single-pole double-throw switch 209 is connected and disposed after the analog and digital converter. In this way, time division switching is performed on a digital signal that is of the radar module and that undergoes digital-to-analog conversion, to implement time division multiplexing of the controller 210 in a digital domain, so that integration of the radar module can be improved. The single-pole double-throw switch 209 is merely an example, and does not impose a limitation on the solutions in this application. During implementation of the solutions in this application, the interface 1 of the MMIC 0 201 and the interface 2 of the MMIC 1 202 may be separately directly connected to the interface 3 of the MCU 210 (not by using a switch or another hardware module), or may be indirectly connected to the interface 3 of the MCU 210 by using another hardware module (for example, a transit module below). Similarly, a radar module and an MCU being connected using a switch, as illustrated in FIG. 3, FIG. 4, FIG. 5, FIG. 7, FIG. 8, and FIG. 13, does not impose a limitation on the solutions in this application. Alternatively, the radar module may be directly connected to the MCU (not by using a switch or another hardware module), or may be indirectly connected to the MCU by using another hardware module. Details are not described below again.

Figure 3:
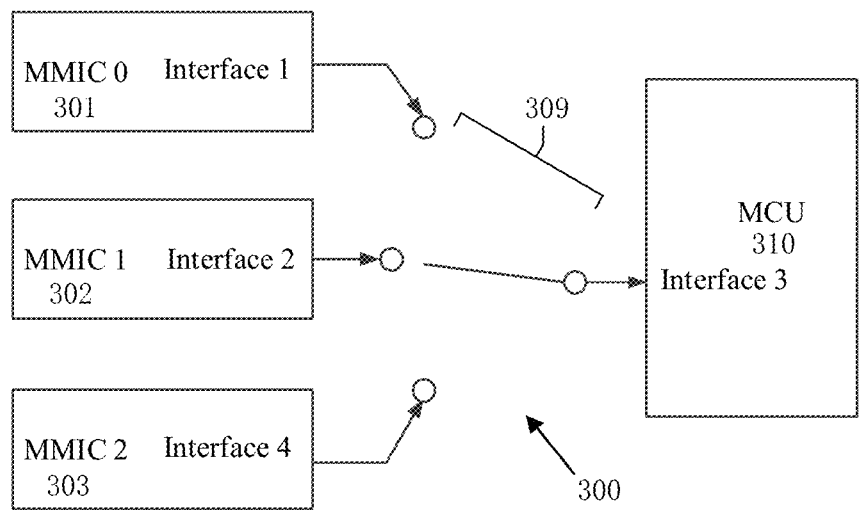
FIG. 3 is a diagram of a radar system according to an embodiment of this application.

FIG. 2 shows only that the two radar modules connected to the controller 210 may multiplex a same interface of the controller 210. It should be understood that more than two radar modules may multiplex a same interface of the controller 210. For example, as shown in FIG. 3, an interface 1 of an MMIC 0 301, an interface 2 of an MMIC 1 302, and an interface 4 of an MMIC 2 303 are separately connected to an interface 3 of an MCU 310. The three radar modules (the MMIC 0 301, the MMIC 1 302, and the MMIC 2 303) multiplex a same interface of a controller 310. A digital signal of the MMIC 0 301, a digital signal of the MMIC 1 302, and a digital signal of the MMIC 2 303 may be transmitted to an interface 3 of the controller 310 in a time division multiplexing manner.

Any interface of the controller 310 in this embodiment of this application is an LVDS interface or a MIPI interface, and any interface of the radar module is an LVDS interface or a MIPI interface. Optionally, if the interface of the controller 310 is an LVDS interface, an interface connected to the controller 310 is also an LVDS interface; or if the interface of the controller 310 is a MIPI interface, an interface connected to the controller 310 is also a MIPI interface. Details are not described below again.

Figure 4:
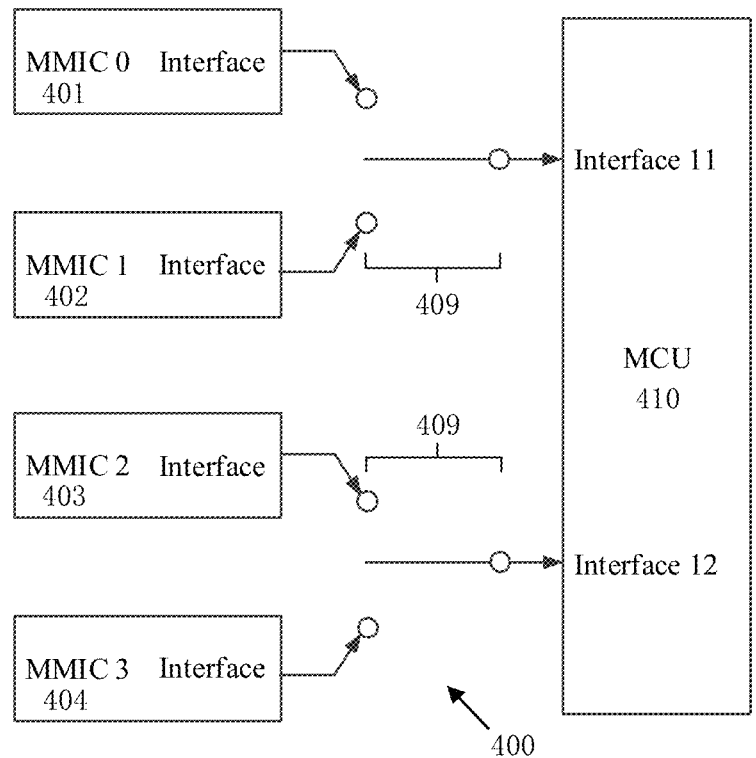
FIG. 4 is a diagram of a radar system according to an embodiment of this application.

In some other embodiments, the controller may alternatively have a plurality of interfaces. The plurality of interfaces of the controller may all be LVDS interfaces, may all be MIPI interfaces, or may include both an LVDS interface and a MIPI interface. For example, the controller has two interfaces (an interface 11 and an interface 12). As shown in FIG. 4, a radar system 400 includes an MCU 410 and four radar modules connected to the MCU 410: an MMIC 0 401, an MMIC 1 402, an MMIC 2 403, and an MMIC 3 404. In the radar system, an interface of the MMIC 0 401 and an interface of the MMIC 1 402 are separately connected to an interface 11 of the MCU 410, and an interface of the MMIC 2 403 and an interface of the MMIC 3 404 are separately connected to an interface 12 of the MCU 410. A digital signal of the MMIC 0 401 and a digital signal of the MMIC 1 402 are transmitted to the interface 11 of the MCU 410 in a time division multiplexing manner, and a digital signal of the MMIC 2 403 and a digital signal of the MMIC 3 404 are transmitted to the interface 12 of the MCU 410 in a time division multiplexing manner.

Figure 5:
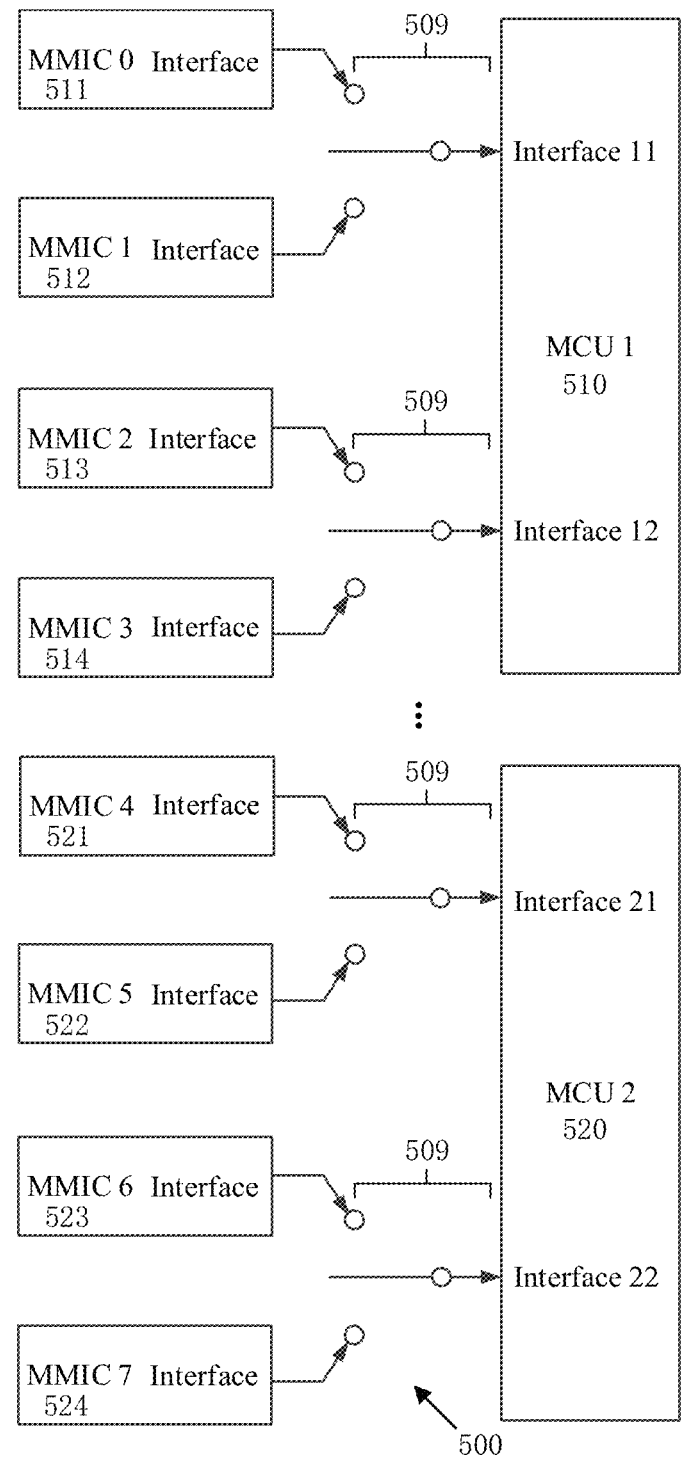
FIG. 5 is a diagram of a radar system according to an embodiment of this application.

A radar system in this embodiment of this application may alternatively include a plurality of controllers. Each controller may be directly or indirectly connected to at least two radar modules. The at least two radar modules connected to each controller implements time division multiplexing of the controller in digital domain. Digital signals of the at least two radar modules connected to each controller are transmitted to the controller in a time division multiplexing manner. For example, the radar system includes two radar modules. As shown in FIG. 5, a radar system 500 includes an MCU 1 510, an MCU 2 520, four radar modules connected to the MCU 1 510: an MMIC 0 511, an MMIC 1 512, an MMIC 2 513, and an MMIC 3 514, and four radar modules connected to the MCU 2 520: an MMIC 4 521, an MMIC 5 522, an MMIC 6 523, and an MMIC 7 524. In the radar system 520, an interface of the MMIC 0 512 and an interface of the MMIC 1 512 are separately connected to an interface 11 of the MCU 1 510, and a digital signal of the MMIC 0 511 and a digital signal of the MMIC 1 512 are transmitted to the interface 11 of the MCU 1 510 in a time division multiplexing manner; an interface of the MMIC 2 513 and an interface of the MMIC 3 514 are separately connected to an interface 12 of the MCU 1 510, and a digital signal of the MMIC 2 513 and a digital signal of the MMIC 3 514 are transmitted to the interface 12 of the MCU 1 510 in a time division multiplexing manner; an interface of the MMIC 4 521 and an interface of the MMIC 5 522 are separately connected to an interface 21 of the MCU 2 520, and a digital signal of the MMIC 4 521 and a digital signal of the MMIC 5 522 are transmitted to the interface 21 of the MCU 2 520 in a time division multiplexing manner; and an interface of the MMIC 6 523 and an interface of the MMIC 7 524 are separately connected to an interface 22 of the MCU 2 520, and a digital signal of the MMIC 6 523 and a digital signal of the MMIC 7 524 are transmitted to the interface 22 of the MCU 2 520 in a time division multiplexing manner.

With reference to the implementation A, when the manner of the time division multiplexing is the module-level time division multiplexing manner, how to implement module-level time division multiplexing may be alternatively described based on different connection relationships between the controller and the at least two radar modules. Specifically, there may be a plurality of possible implementations. The following separately describes an implementation A1, an implementation A2, and an implementation A3.

In the implementation A1, the controller is directly connected to the at least two radar modules. For example, the controller is directly connected to a first radar module and a second radar module. In the implementation a1, statuses of interfaces of the first radar module and the second radar module may be controlled by using software to implement the module-level time division multiplexing.

In the implementation A1, the first radar module includes a first interface, the second radar module includes a second interface, and the controller includes a third interface, and digital signals of the first radar module and the second radar module that are directly connected to the third interface of the controller are transmitted to the controller in a time division multiplexing manner. When the first radar module transmits a first digital signal to the third interface of the controller through the first interface, the second interface of the second radar module is in a high-impedance state; or when the second radar module transmits a second digital signal to the third interface of the controller through the second interface, the first interface is in a high-impedance state. Therefore, the module-level time division multiplexing of the third interface of the controller may be implemented by controlling the statuses of the interfaces of the first radar module and the second radar module.

Figure 6:
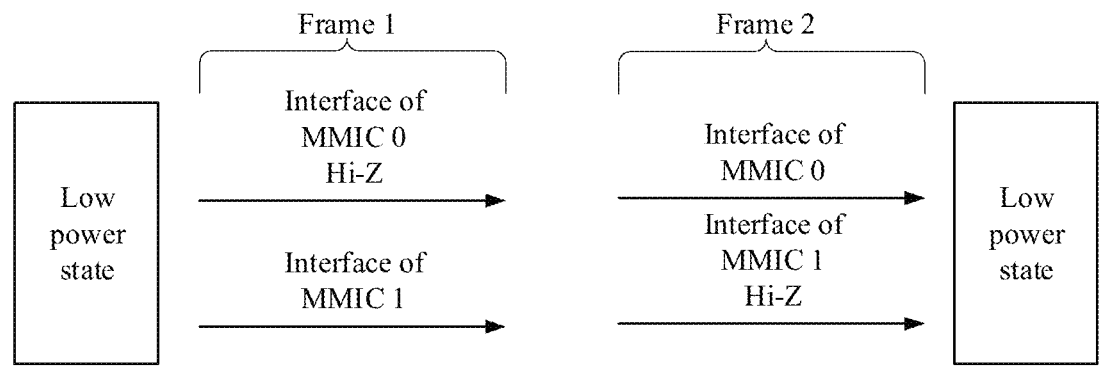
FIG. 6 is a diagram of a software-controlled module-level time division multiplexing according to an embodiment of this application.

The radar system shown in FIG. 2 is used as an example to describe a process in which digital signals of the MMIC 0 and the MMIC 1 are transmitted to the MCU in a time division multiplexing manner. For details, refer to FIG. 6. Both an initial state of the interface of the MMIC 0 and an initial state of the interface of the MMIC 1 are a low power (low power) state. Within a first time unit, that is, within a frame 1 in FIG. 6, the interface of the MMIC 0 is in a high-impedance state, and the MMIC 1 transmits a digital signal to the MCU. Within a second time unit, that is, within a frame 2 in FIG. 6, the MMIC 0 transmits a digital signal to the MCU, and the interface of the MMIC 1 is in a high-impedance state. Then, the interface of the MMIC 0 and the interface of the MMIC 1 enter the low power state.

In an implementation, when the radar system includes a plurality of radar modules connected to the controller, digital signals of the plurality of radar modules are transmitted to the controller in a time division multiplexing manner to implement the module-level time division multiplexing. For example, the radar system includes three radar modules. A first radar module includes a first interface, a second radar module includes a second interface, and a third radar module includes a fourth interface.

If the controller supports one interface, that is, the third interface, within one time unit, when any radar module in the radar system transmits a digital signal to a third interface of the controller, other radar modules other than the radar module that transmits the digital signal are in a high-impedance state, and radar modules that transmit digital signals to the controller within two adjacent time units are different. For example, within a first time unit, the first radar module transmits a digital signal to the controller; within a second time unit, the second radar module transmits a digital signal to the controller; within a third time unit, the first radar module transmits a digital signal to the controller; and within a fourth time unit, the third radar module transmits a digital signal to the controller.

If the controller supports a plurality of interfaces, for example, supports two interfaces: the third interface and a fifth interface, within one time unit, any two radar modules in the plurality of radar modules transmit digital signals to the controller, and there is at least one different radar module in radar modules that transmit digital signals to the controller within two adjacent time units. For example, within a first time unit, the first radar module and the third radar module transmit digital signals to the controller; and within a second time unit, the first radar module and the second radar module transmit digital signals to the controller.

In the implementation A2, the controller is indirectly connected to at least two radar modules. In the implementation A2, digital signals of the at least two radar modules may be controlled by a hardware module to be transmitted to the controller in a time division multiplexing manner.

In the implementation A2, for example, the hardware module is a transit module. The radar system further includes the transit module, and a first radar module and a second radar module are separately connected to the controller by using the transit module, to implement the time division multiplexing.

It should be noted that the transit module in this embodiment of this application may be a transit chip. For example, the transit module may be a logic chip or a multiplexer. Details are not described below again.

In the implementation A2, when the first radar module is electrically connected to the controller by using the transit module, the second radar module is disconnected from the transit module; or when the second radar module is electrically connected to the controller by using the transit module, the first radar module is disconnected from the transit module.

If the transit module is a logic chip, switchover between a plurality of modes can be supported, and a time division multiplexing solution can be implemented more flexibly. For example, the transit module is a logic chip, and the radar system includes four radar modules and one MCU. The MCU supports two interfaces: an interface 1 and an interface 2. In this way, time division switching may be performed in the following plurality of modes. For example, in a mode 1, a radar module 1 is connected to the interface 1 of the MCU by using the logic chip, and a radar module 2 is connected to the interface 2 of the MCU by using the logic chip; for example, in a mode 2, the radar module 1 is connected to the interface 1 of the MCU by using the logic chip, and a radar module 3 is connected to the interface 2 of the MCU by using the logic chip; for example, in a mode 3, the radar module 1 is connected to the interface 1 of the MCU by using the logic chip, and a radar module 4 is connected to the interface 2 of the MCU by using the logic chip; for example, in a mode 5, the radar module 2 is connected to the interface 1 of the MCU by using the logic chip, and the radar module 3 is connected to the interface 2 of the MCU by using the logic chip; for example, in a mode 6, the radar module 2 is connected to the interface 1 of the MCU by using the logic chip, and the radar module 4 is connected to the interface 2 of the MCU by using the logic chip; and for example, in a mode 7, the radar module 3 is connected to the interface 1 of the MCU by using the logic chip, and the radar module 4 is connected to the interface 2 of the MCU by using the logic chip. Within different time units, a connection manner in any one of the mode 1 to the mode 7 may be used. For example, a connection manner in the mode 1 is used within a first time unit, and a connection manner in the mode 2 is used within a second time unit. In this way, module-level time division multiplexing is implemented by using hardware.

If the transit module is a multiplexer, switchover between modes is limited compared with a case in which the transit module is a logic chip, but more costs are reduced.

In the implementation A3, the controller is directly connected to one part of the at least two radar modules, and indirectly connected to the other part of the at least two radar modules. For example, the radar system includes a first radar module, a second radar module, and a third radar module. The first radar module and the second radar module are separately connected to the controller by using a transit module, to implement the time division multiplexing, and the third radar module is directly connected to the controller. For implementations of direct connecting and indirect connecting, refer to the implementation A1 and the implementation A2. Details are not described herein again.

In the foregoing embodiment, the digital signals of the at least two radar modules connected to the controller are transmitted to the controller in the module-level time division multiplexing manner, and each radar module may include at least one receive channel. In this way, a quantity of receive channels in the radar system can be effectively increased, and a larger antenna array size can be provided, so that a maximum detection distance, an unambiguous angle range, and an angular resolution can be increased, and system performance is improved.

Based on the foregoing embodiment, the module-level time division multiplexing manner may be applied to a radar system in which radar modules have different antenna arrays, so that digital signals of the radar modules with different antenna arrays are transmitted to the controller in a time division multiplexing manner. For example, the radar system includes the first radar module and the second radar module. The radar system further includes a first antenna array corresponding to the first radar module and a second antenna array corresponding to the second radar module.

Figure 7:
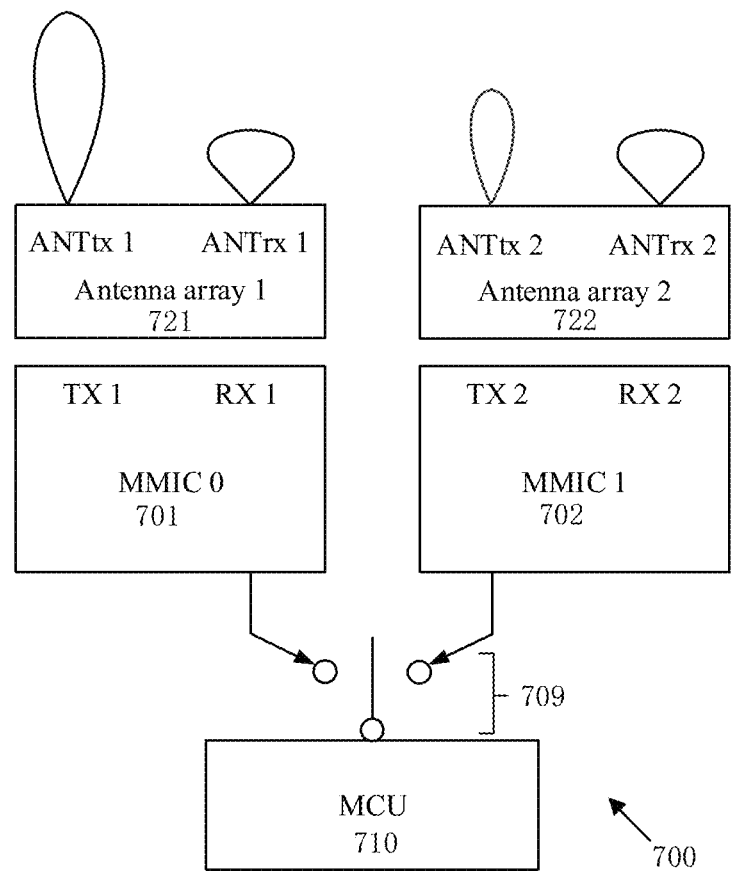
FIG. 7 is a diagram of an application scenario 1 of channel-level time division multiplexing according to an embodiment of this application.

For example, as shown in FIG. 7, the first radar module is an MMIC 0 701 and the second radar module is an MMIC 1 702. A digital signal of the MMIC 0 701 and a digital signal of the MMIC 1 702 are transmitted to an MCU 710 in a time division multiplexing manner. The MMIC 0 701 corresponds to an antenna array 1 721, and the antenna array 1 721 includes a transmit antenna ANTtx 1 connected to a transmit channel TX 1 in the MMIC 0 701 and a receive antenna ANTrx 1 connected to a receive channel RX 1 in the MMIC 0701. The MMIC 1 702 corresponds to an antenna array 2 722, and the antenna array 2 722 includes a transmit antenna ANTtx 2 connected to a transmit channel TX 2 in the MMIC 1 702 and a receive antenna ANTrx 2 connected to a receive channel RX 2 in the MMIC 1 702. Herein, the transmit channel is a channel configured to transmit a transmit signal to a transmit antenna, and the receive channel is a channel configured to receive a signal from a transmit antenna and transmit the signal to the MCU 710. For example, within a first time unit, an echo signal received by the receive antenna ANTrx 1 is converted into a digital signal by using the receive channel in the MMIC 0 701, and sent to the MCU 710; and within a second time unit, an echo signal received by the receive antenna ANTrx 2 is converted into a digital signal by using the receive channel in the MMIC 1 702, and sent to the MCU 710.

In a possible implementation, detection power of the transmit antenna ANTtx 1 721 is greater than or equal to detection power of the transmit antenna ANTtx 2 722. Herein, the detection power may also be understood as a detection distance or a radiation distance. When the detection power of the transmit antenna ANTtx 1 is greater than the detection power of the transmit antenna ANTtx 2, the antenna array 1 721 may detect a target that is relatively far away, and an antenna array 2 722 may detect a target that is relatively close, to adapt to a plurality of target detection scenarios, save MCU chips, and reduce costs.

In a scenario shown in FIG. 7, the MMIC 0 701 and the MMIC 1 702 may be radar modules of a same type, or may be different radar modules. According to the foregoing example, when the MMIC 0 701 and the MMIC 1 702 are radar modules of a same type, all radar systems in a same system can multiplex a same MCU 710; and when the MMIC 0 701 and the MMIC 1 702 are different radar modules, all radar systems in different systems can multiplex a same MCU 710. In this way, MCU chips are saved, and costs are reduced.

In some other embodiments, the module-level time division multiplexing manner may be alternatively applied to a radar system in which different radar modules have a same antenna array, so that the different radar modules in the radar system share the same antenna array. In this way, receive channels in the different radar systems may implement time division multiplexing. For example, the radar system includes the first radar module and the second radar module. The radar system further includes a third antenna array, and the first radar module and the second radar module are separately connected to the third antenna array.

Figure 8:
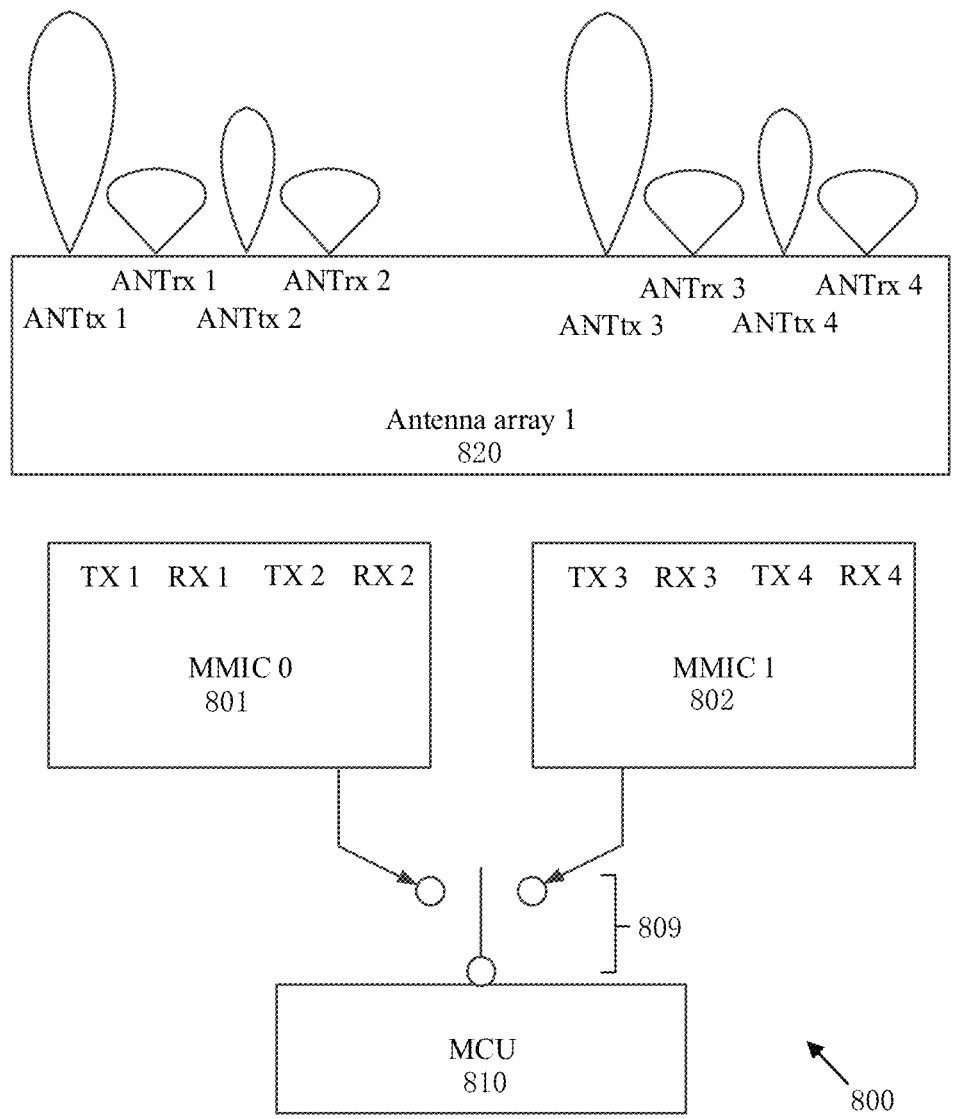
FIG. 8 is a diagram of an application scenario 2 of channel-level time division multiplexing according to an embodiment of this application.

For example, as shown in FIG. 8, the first radar module in the radar system 800 is an MMIC 0 801 and the second radar module is an MMIC 1 802. The radar system 800 further includes an antenna array 1 820. The MMIC 0 801 and the MMIC 1 802 are connected to the antenna array 1 820. The antenna array 1 820 includes transmit antennas: an ANTtx 1, an ANTtx 2, an ANTtx 3, and an ANTtx 4 and receive antennas: an ANTrx 1, an ANTrx 2, an ANTrx 3, and an ANTrx 4. For the transmit antennas connected to transmit channels TX, the transmit antennas ANTtx 1 and ANTtx 3 operate simultaneously, the transmit antennas ANTtx 2 and ANTtx 4 operate simultaneously, the transmit antennas ANTtx 2 and ANTtx 3 operate simultaneously, or the transmit antennas ANTtx 1 and ANTtx 4 operate simultaneously. For the receive antennas connected to receive channels RX, the ANTrx 1 and the ANTrx 2 operate simultaneously, or the ANTrx 3 and the ANTrx 4 operate simultaneously, and in this way, the receive channels in the two radar modules can multiplex an interface of the MCU 810. The antenna array 820 shown in FIG. 8 may include different subarrays, for example, a large antenna array and a small antenna array. For example, the large antenna array includes the transmit antennas ANTtx 1 and ANTtx 3, and may detect a target that is relatively far away, and the small antenna array includes the transmit antennas ANTtx 2 and ANTtx 4, and may detect a target that is relatively close. In this way, one antenna array can meet a requirement of detecting targets at different distances.

In the foregoing embodiment, the module-level time division multiplexing manner is applied to the radar system, to adapt to an antenna array arrangement solution and an algorithm solution, and help reduce cabling complexity and an insertion loss of a feeder connecting an antenna to the radar module.

In the implementation B, the at least two radar modules may multiplex an MCU in digital domain through channel-level time division multiplexing. In the implementation b, two radar modules are used as an example. A first digital signal of a first radar module and a second digital signal of a second radar module are transmitted to the controller in a channel-level time division multiplexing manner.

It should be noted that a channel in this embodiment of this application is a receive channel, unless it is particularly specified that the channel is a transmit channel. The receive channel is described from a perspective of a radar system. After a receive antenna in the radar system receives a signal, the signal is transmitted to the controller through a receive channel that is in a radar module and that is connected to the receive antenna. Each of the radar modules MMIC 0 201 and MMIC 1 202 shown in FIG. 2 includes one channel. The MMIC 0 is used as an example. As shown in FIG. 2, the MMIC 0 201 includes one channel. A channel may specifically include all components from a component (for example, the low noise amplifier shown in FIG. 2) that is in the MMIC 0 201 and that receives a signal from a receive antenna to the interface 1. Details are not described below again. In some other embodiments, one radar module may alternatively include a plurality of channels.

With reference to the implementation b, when a manner of the time division multiplexing is the channel-level time division multiplexing manner, how to implement channel-level time division multiplexing may be alternatively described based on different connection relationships between the controller and the at least two radar modules. Specifically, there may be a plurality of possible implementations. For example, the controller is directly or indirectly connected to a first radar module and a second radar module. The following separately describes an implementation B1, an implementation B2, and an implementation B3.

In the implementation B1, the controller is directly connected to the first radar module and the second radar module. In the implementation B1, statuses of channel interfaces of the first radar module and the second radar module may be controlled by using software to implement the channel-level time division multiplexing.

In an implementation b1, a first interface may include a plurality of channel interfaces, and a second interface may include a plurality of channel interfaces. When the first radar module is electrically connected to a third interface of the controller by using at least one channel interface in the first interface, all the channel interfaces in the second interface of the second radar module are in a high-impedance state; or when the first radar module is electrically connected to a third interface of the controller by using at least one channel interface in the first interface, some of the channel interfaces in the second interface of the second radar module are in a high-impedance state. This may be alternatively understood as follows: When the first radar module transmits a first digital signal to the third interface of the controller through at least one channel interface in the first interface, all the channel interfaces in the second interface of the second radar module are in a high-impedance state; or when the first radar module transmits a first digital signal to the third interface of the controller through at least one channel interface in the first interface, some of the channel interfaces in the second interface of the second radar module are in a high-impedance state.

In this implementation, that the first radar module transmits the first digital signal to the third interface of the controller through at least one channel interface in the first interface includes the following case 1 and case 2.

In the case 1, the first radar module transmits the first digital signal to the third interface of the controller through some of the channel interfaces in the first interface. For example, the first interface of the first radar module includes four channel interfaces. Three of the four channel interfaces separately transmit digital signals to the controller. In this case, the first digital signal is a sum of the digital signals transmitted by the three channel interfaces.

If in the case 1, all the channel interfaces in the second interface of the second radar module are in a high-impedance state, in other words, all the channel interfaces in the second interface of the second radar module do not transmit digital signals, the some of the channel interfaces in the first interface of the first radar module and all the channel interfaces in the second interface of the second radar module implement the channel-level time division multiplexing.

If in the case 1, some of the channel interfaces in the second interface of the second radar module are in a high-impedance state, in other words, one part of the channel interfaces in the second interface of the second radar module do not transmit digital signals, and the other part of the channel interfaces in the second interface of the second radar module transmit digital signals, the some of the channel interfaces in the first interface of the first radar module and the some of the channel interfaces in the second interface of the second radar module implement the channel-level time division multiplexing, where the second digital signal includes a sum of the digital signals transmitted by the other part of the channel interfaces in the second interface of the second radar module.

In the case 2, the first radar module transmits a first digital signal to the third interface of the controller through all the channel interfaces in the first interface. For example, the first interface of the first radar module includes four channel interfaces. The four channel interfaces separately transmit digital signals to the controller. In this case, the first digital signal is a sum of the digital signals transmitted by the four channel interfaces.

If in the case 2, all the channel interfaces in the second interface of the second radar module are in a high-impedance state, in other words, all the channel interfaces in the second interface of the second radar module do not transmit digital signals, all the channel interfaces in the first interface of the first radar module and all the channel interfaces in the second interface of the second radar module implement the module-level time division multiplexing.

If in the case 2, some of the channel interfaces in the second interface of the second radar module are in a high-impedance state, in other words, one part of the channel interfaces in the second interface of the second radar module do not transmit digital signals, and the other part of the channel interfaces in the second interface of the second radar module transmit digital signals, all the channel interfaces in the first interface of the first radar module and the some of the channel interfaces in the second interface of the second radar module implement the channel-level time division multiplexing, where the second digital signal is a sum of the digital signals transmitted by the other part of the channel interfaces in the second interface of the second radar module.

Figure 9:
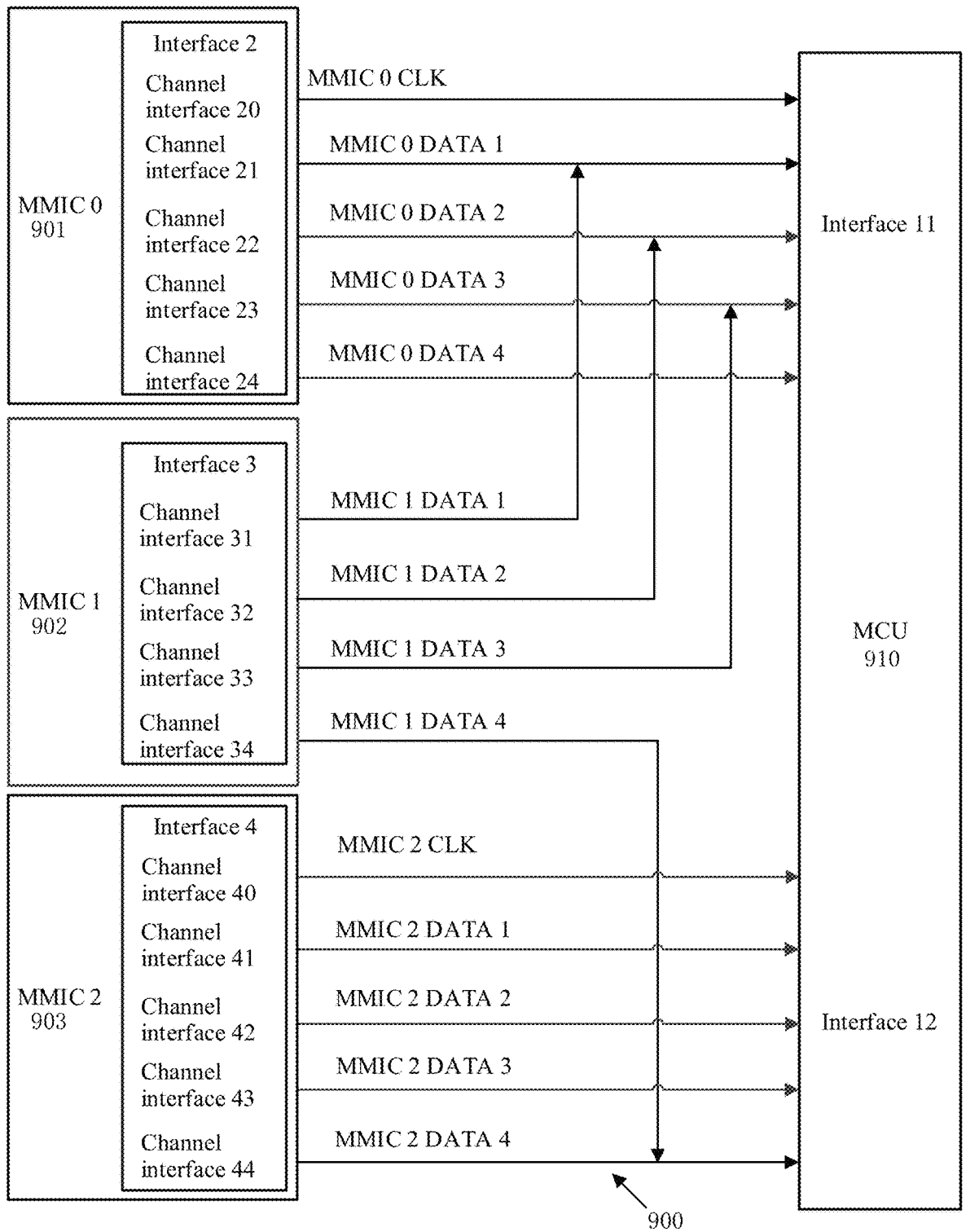
FIG. 9 is a diagram of a radar system according to an embodiment of this application.
Figure 10:
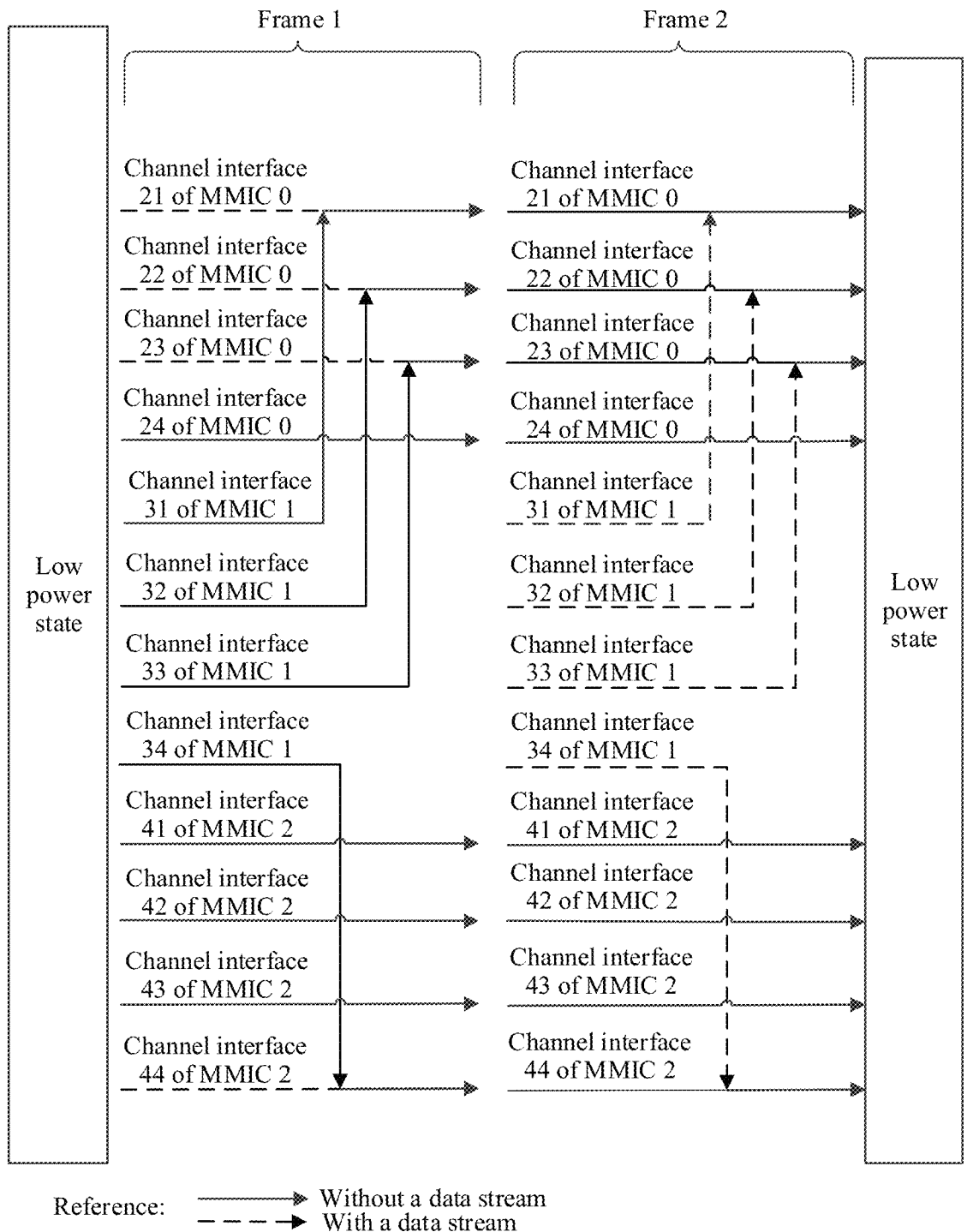
FIG. 10 is a diagram of a software-controlled channel-level time division multiplexing according to an embodiment of this application.

The following describes the implementation B1 with reference to FIG. 9 and FIG. 10.

In a radar system 900 shown in FIG. 9, an MCU 910 is connected to three radar modules: an MMIC 0 901, an MMIC 1 902, and an MMIC 2 903. The radar module includes four channels for transmitting digital signals to the MCU 910. Each channel is connected to one channel interface. The MMIC 0 901 includes a channel interface 21 for transmitting MMIC 0 DATA 1, a channel interface 22 for transmitting MMIC 0 DATA 2, a channel interface 23 for transmitting MMIC 0 DATA 3, and a channel interface 24 for transmitting MMIC 0 DATA 4, and further includes a channel interface 20 for transmitting a clock signal. The MMIC 1 902 includes a channel interface 31 for transmitting MMIC 1 DATA 1, a channel interface 32 for transmitting MMIC 1 DATA 2, a channel interface 33 for transmitting MMIC 1 DATA 3, and a channel interface 34 for transmitting MMIC 1 DATA 4. The MMIC 2 903 includes a channel interface 41 for transmitting MMIC 2 DATA 1, a channel interface 42 for transmitting MMIC 2 DATA 2, a channel interface 43 for transmitting MMIC 2 DATA 3, and a channel interface 44 for transmitting MMIC 2 DATA 4, and further includes a channel interface 40 for transmitting a clock signal.

The channel interface 21, the channel interface 22, the channel interface 23, and the channel interface 24 of the MMIC 0 901, and the channel interface 31, the channel interface 32, and the channel interface 33 of the MMIC 1 902 are all connected to an interface 11 of the controller 910. The channel interface 34 of the MMIC 1 902, and the channel interface 41, the channel interface 42, the channel interface 43, and the channel interface 44 of the MMIC 2 903 are all connected to an interface 12 of the controller 910. The channel interfaces connected to the interface 11 may transmit first digital signals to the interface 11 of the controller 910 in a time division multiplexing manner. The channel interfaces connected to the interface 12 may transmit second digital signals to the interface 12 of the controller 910 in a time division multiplexing manner. A specific quantity of channels that can simultaneously transmit digital signals to one interface depends on a specific quantity of channels on which simultaneous receiving can be supported by an MCU specification. For example, the implementation B1 is described by using an example in which one interface of the controller 910 can simultaneously receive digital signals transmitted by four channels.

Refer to FIG. 10. All initial states of the channel interfaces of the MMIC 0 901, the channel interfaces of the MMIC 1 902, and the channel interfaces of the MMIC 2 903 are a low power state. Within a first time unit, that is, within a frame 1 in FIG. 10, the MMIC 1 902 transmits digital signals to the interface 11 of the MCU 910 through the channel interface 31, the channel interface 32, and the channel interface 33, the MMIC 0 901 transmits a digital signal to the interface 11 of the MCU 910 through the channel interface 24, the MMIC 1 902 transmits a digital signal to the interface 12 of the MCU 910 through the channel interface 34, the MMIC 2 903 transmits digital signals to the interface 12 of the MCU 910 through the channel interface 41, the channel interface 42, and the channel interface 43, and the channel interface 21, the channel interface 22, and the channel interface 23 of the MMIC 0 901 and the channel interface 44 of the MMIC 2 903 are in a high-impedance state. Within a second time unit, that is, within a frame 2 in FIG. 10, the MMIC 0 901 transmits digital signals to the interface 11 of the MCU 910 through the channel interface 21, the channel interface 22, the channel interface 23, and the channel interface 24, the MMIC 2 903 transmits digital signals to the interface 12 of the MCU 910 through the channel interface 41, the channel interface 42, the channel interface 43, and the channel interface 44, and the channel interface 31, the channel interface 32, the channel interface 33, and the channel interface 34 of the MMIC 1 902 are in a high-impedance state. Then, the channel interfaces of the MMIC 0 901, the channel interfaces of the MMIC 1 902, and the channel interfaces of the MMIC 2 903 enter the low power state.

In the implementation B2, the controller 910 is indirectly connected to the first radar module and the second radar module. In the implementation B2, a first digital signal of the first radar module and a second digital signal of the second radar module may be controlled by a hardware module to be transmitted to the controller in the channel-level time division multiplexing manner.

In THE implementation B2, when the first radar module includes a plurality of channels, and the second radar module includes a plurality of channels, when at least one channel of the first radar module is electrically connected to the controller by using a transit module, all the channels of the second radar module are disconnected from the transit module; or when at least one channel of the first radar module is electrically connected to the controller by using a transit module, some of the channels of the second radar module are disconnected from the transit module; or when at least one channel of the first radar module is electrically connected to the controller by using a transit module, one part of the channels of the second radar module are disconnected from the transit module, and the one part of the channels of the second radar module are electrically connected to the controller.

In this implementation, that at least one channel of the first radar module is electrically connected to the controller by using a transit module includes the following case 1 and case 2.

In the case 1, some of the channels of the first radar module are electrically connected to the controller by using the transit module. For example, the first radar module includes four channels, and two of the four channels are electrically connected to the controller by using the transit module. In this case, the first radar module transmits digital signals to the controller through the two channels, and the first digital signal is a sum of the digital signals transmitted through the two channels.

If in the case 1, all the channels of the second radar module are disconnected from the transit module, in other words, all the channels of the second radar module do not transmit digital signals, the some of the channels of the first radar module and all the channels of the second radar module implement channel-level time division multiplexing.

If in the case 1, some of the channels of the second radar module are disconnected from the transit module, in other words, one part of the channels of the second radar module do not transmit digital signals, and the other part of the channels of the second radar module transmit digital signals, the some of the channels of the first radar module and the some of the channels of the second radar module implement channel-level time division multiplexing, where the second digital signal is a sum of the digital signals transmitted by the other part of the channels of the second radar module.

If in the case 1, one part of the channels of the second radar module are disconnected from the transit module, and the one part of the channels of the second radar module are electrically connected to the controller, in other words, the one part of the channels of the second radar module separately transmit digital signals to the controller, and the other part of the channels of the second radar module separately transmit digital signals to the controller by using the transit module, the first digital signal is a sum of the digital signals separately transmitted by the one part of the channels to the controller, and the digital signals separately transmitted by the other part of the channels to the controller by using the transit module.

In the case 2, all the channels of the first radar module are electrically connected to the controller by using the transit module. For example, the first radar module includes four channels, and all the four channels are electrically connected to the controller by using the transit module. In this case, the first radar module transmits digital signals to the controller through all the channels, and the first digital signal is a sum of the digital signals transmitted through the four channels.

If in the case 2, all the channels of the second radar module are disconnected from the transit module, in other words, all the channels of the second radar module do not transmit digital signals, all the channels of the first radar module and all the channels of the second radar module implement channel-level time division multiplexing.

If in the case 2, some of the channels of the second radar module are disconnected from the transit module, in other words, one part of the channels of the second radar module do not transmit digital signals, and the other part of the channels of the second radar module transmit digital signals, all the channels of the first radar module and the some of the channels of the second radar module implement channel-level time division multiplexing, where the second digital signal is a sum of the digital signals transmitted by the other part of the channels of the second radar module.

If in the case 2, one part of the channels of the second radar module are disconnected from the transit module, and the one part of the channels of the second radar module are electrically connected to the controller, in other words, the one part of the channels of the second radar module separately transmit digital signals to the controller, and the other part of the channels of the second radar module separately transmit digital signals to the controller by using the transit module, all the channels of the first radar module and the one part of the channels of the second radar module implement channel-level time division multiplexing, where the first digital signal is a sum of the digital signals separately transmitted by the one part of the channels to the controller, and the digital signals separately transmitted by the other part of the channels to the controller by using the transit module.

In any one of the foregoing embodiments, the transit module is a logic chip or a multiplexer. Therefore, a module-level or channel-level time division multiplexing solution can be flexibly implemented. If the transit module is a logic chip, switchover between a plurality of modes can be supported, and the time division multiplexing solution can be implemented more flexibly. If the transit module is a multiplexer, more costs can be reduced.

Figure 11:
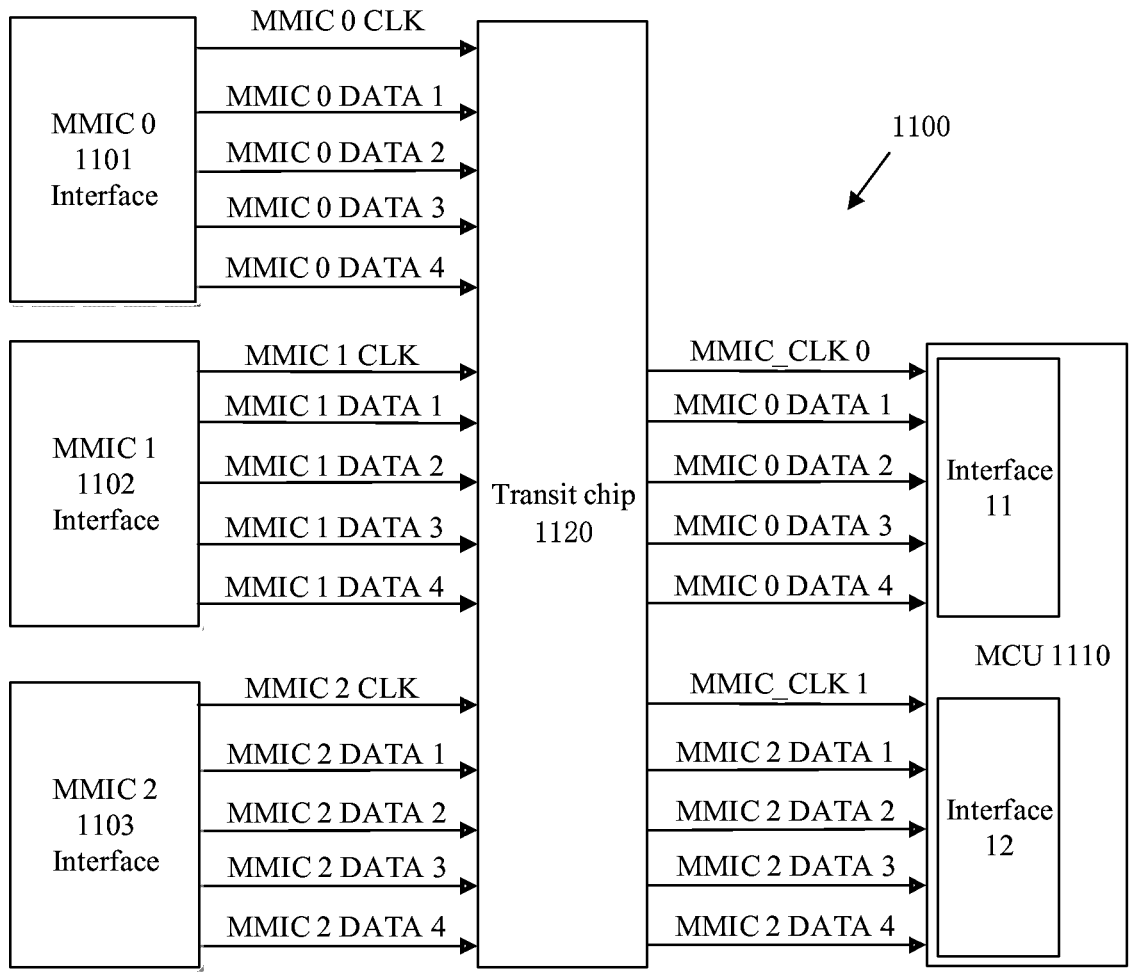
FIG. 11 is a diagram of a radar system according to an embodiment of this application.
Figure 12:
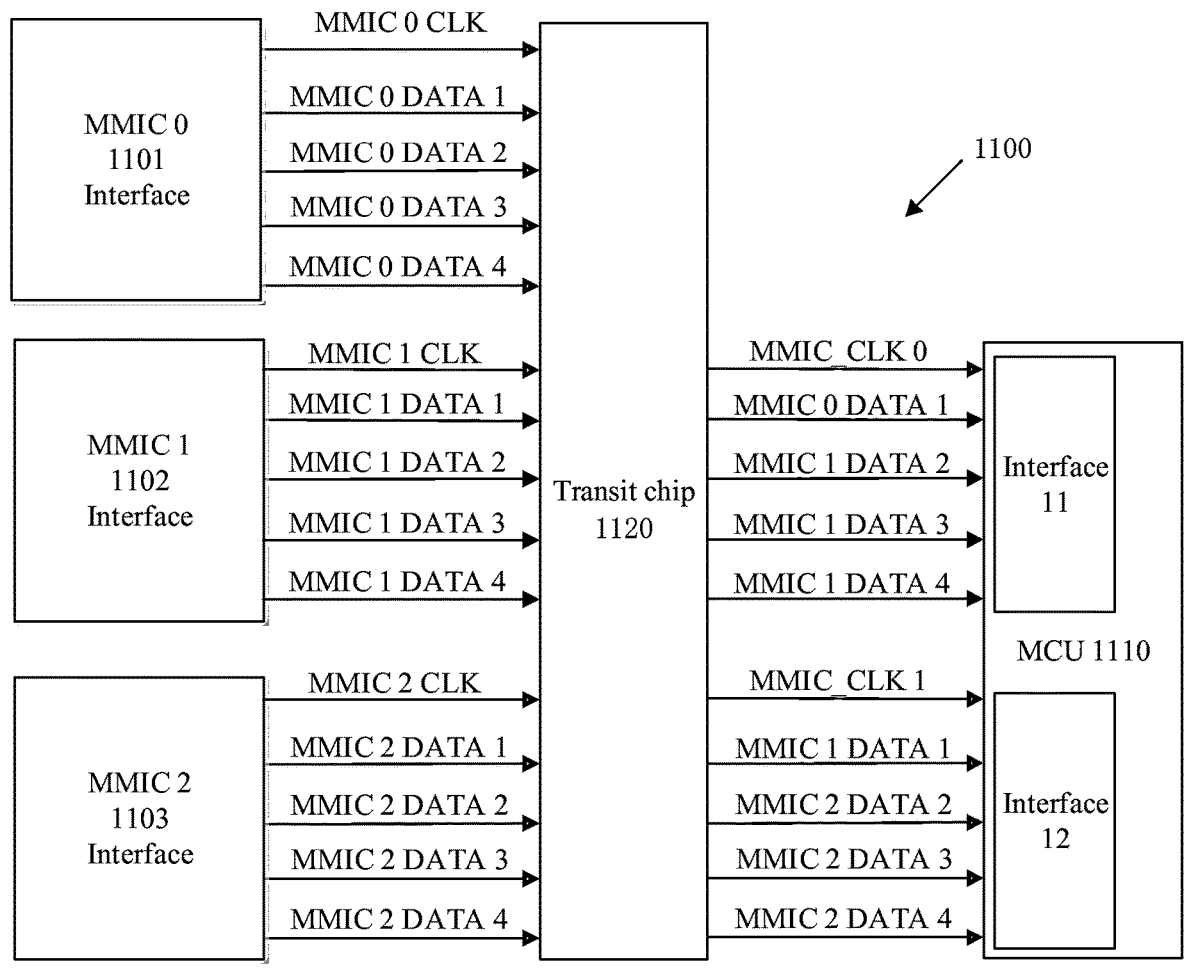
FIG. 12 is a diagram of a radar system according to an embodiment of this application.

The following describes the implementation B2 with reference to FIG. 11 and FIG. 12.

In a radar system shown in FIG. 11 and FIG. 12, a transit module 1120 is separately connected to an MCU 1110 and three radar modules. The three radar modules are an MMIC 0 1101, an MMIC 1 1102, and an MMIC 2 1103. The radar module includes four channels for transmitting digital signals to the MCU 1110. Each channel is connected to one channel interface. The MMIC 0 1101 includes a channel for transmitting MMIC 0 DATA 1, a channel for transmitting MMIC 0 DATA 2, a channel for transmitting MMIC 0 DATA 3, and a channel for transmitting MMIC 0 DATA 4, and further includes a channel for transmitting a clock signal. The MMIC 1 1102 includes a channel for transmitting MMIC 1 DATA 1, a channel for transmitting MMIC 1 DATA 2, a channel for transmitting MMIC 1 DATA 3, and a channel for transmitting MMIC 1 DATA 4. The MMIC 2 1103 includes a channel for transmitting MMIC 2 DATA 1, a channel for transmitting MMIC 2 DATA 2, a channel for transmitting MMIC 2 DATA 3, and a channel for transmitting MMIC 2 DATA 4, and further includes a channel for transmitting a clock signal. The MCU 1110 includes an interface 11 and an interface 12. For example, each interface of the MCU 1110 supports being connected to four channels of the radar modules. In this case, among the 12 channels that are included in the MMIC 0 1101, the MMIC 1 1102, and the MMIC 2 1103 and that are used for transmitting a digital signal, any eight channels may be simultaneously connected to the MCU 1110 by using the transit module 1120.

For example, all channels included in any two chips in the MMIC 0 1101, the MMIC 1 1102, and the MMIC 2 1103 are simultaneously connected to the MCU 1110 by using the transit module 1120, and all channels in a remaining chip other than the two chips are disconnected from the transit module 1120. As shown in FIG. 11, within a first time unit, all the channels in the MMIC 0 1101 and the MMIC 2 1103 are simultaneously connected to the MCU 1110 by using the transit module 1120, and all the channels in the MMIC 1 1102 are disconnected from the transit module 1120; and within a second time unit, all the channels in the MMIC 0 1101 and the MMIC 1 1102 are simultaneously connected to the MCU by using the transit module 1120, and all the channels in the MMIC 2 1103 are disconnected from the transit module 1120.

For example, any eight of the 12 channels included in the MMIC 0, the MMIC 1, and the MMIC 2 are simultaneously connected to the MCU by using the transit module 1120, and the remaining four channels other than the eight channels are disconnected from the transit module 1120. For example, within a first time unit, as shown in FIG. 12, the channel for transmitting MMIC 0 DATA 1, the channel for transmitting MMIC 1 DATA 1, the channel for transmitting MMIC 1 DATA 2, the channel for transmitting MMIC 1 DATA 3, the channel for transmitting MMIC 1 DATA 1, the channel for transmitting MMIC 2 DATA 2, the channel for transmitting MMIC 2 DATA 3, and the channel for transmitting MMIC 2 DATA 4 are connected to the MCU 1110 by using the transit module 1120, and the channel for transmitting MMIC 0 DATA 2, the channel for transmitting MMIC 0 DATA 3, the channel for transmitting MMIC 0 DATA 4, and the channel for transmitting MMIC 2 DATA 1 are disconnected from the transit module 1120. Within a second time unit, the channel for transmitting MMIC 0 DATA 1, the channel for transmitting MMIC 0 DATA 2, the channel for transmitting MMIC 0 DATA 3, the channel for transmitting MMIC 1 DATA 1, the channel for transmitting MMIC 1 DATA 4, the channel for transmitting MMIC 2 DATA 2, the channel for transmitting MMIC 2 DATA 3, and the channel for transmitting MMIC 2 DATA 4 are controlled to be connected to the MCU 1110 by using the transit module 1120, and the channel for transmitting MMIC 0 DATA 4, the channel for transmitting MMIC 1 DATA 2, the channel for transmitting MMIC 1 DATA 3, and the channel for transmitting MMIC 2 DATA 1 are controlled to be disconnected from the transit module 1120.

For example, the transit module 1120 may be a logic chip or a multiplexer. Therefore, the module-level or channel-level time division multiplexing solution can be flexibly implemented. If the transit module 1120 is a logic chip, switchover between a plurality of modes can be supported, and the time division multiplexing solution can be implemented more flexibly. If the transit module 1120 is a multiplexer, more costs can be reduced.

In the implementation B3, the controller 1110 is directly connected to one part of all channels included in the at least two radar modules, and indirectly connected to the other part of all the channels included in the at least two radar modules. For the implementation B3, refer to the implementation B1 and the implementation B2. Details are not described herein again.

The radar system in this embodiment of this application may include a plurality of radar modules. Each radar module may include a plurality of channels used to transmit signals to the controller. These channels may be classified into a plurality of groups of channels. Each group of channels may include all channels of one or more radar modules, or each group of channels may include all channels of one or more radar modules and some of channels of other one or more radar modules, or each group of channels may include some of channels of a plurality of radar modules. These groups of channels implement time division multiplexing of the controller. In other words, at a same moment, the controller receives digital signals transmitted by one or more groups of channels.

Based on the foregoing embodiment, the module-level time division multiplexing manner may be applied to a radar system in which radar modules have different antenna arrays, so that digital signal of radar modules belonging to a same system are transmitted to the controller in the channel-level time division multiplexing manner. For example, the radar system includes the first radar module and the second radar module. The radar system further includes a first antenna array corresponding to the first radar module and a second antenna array corresponding to the second radar module.

Figure 13:
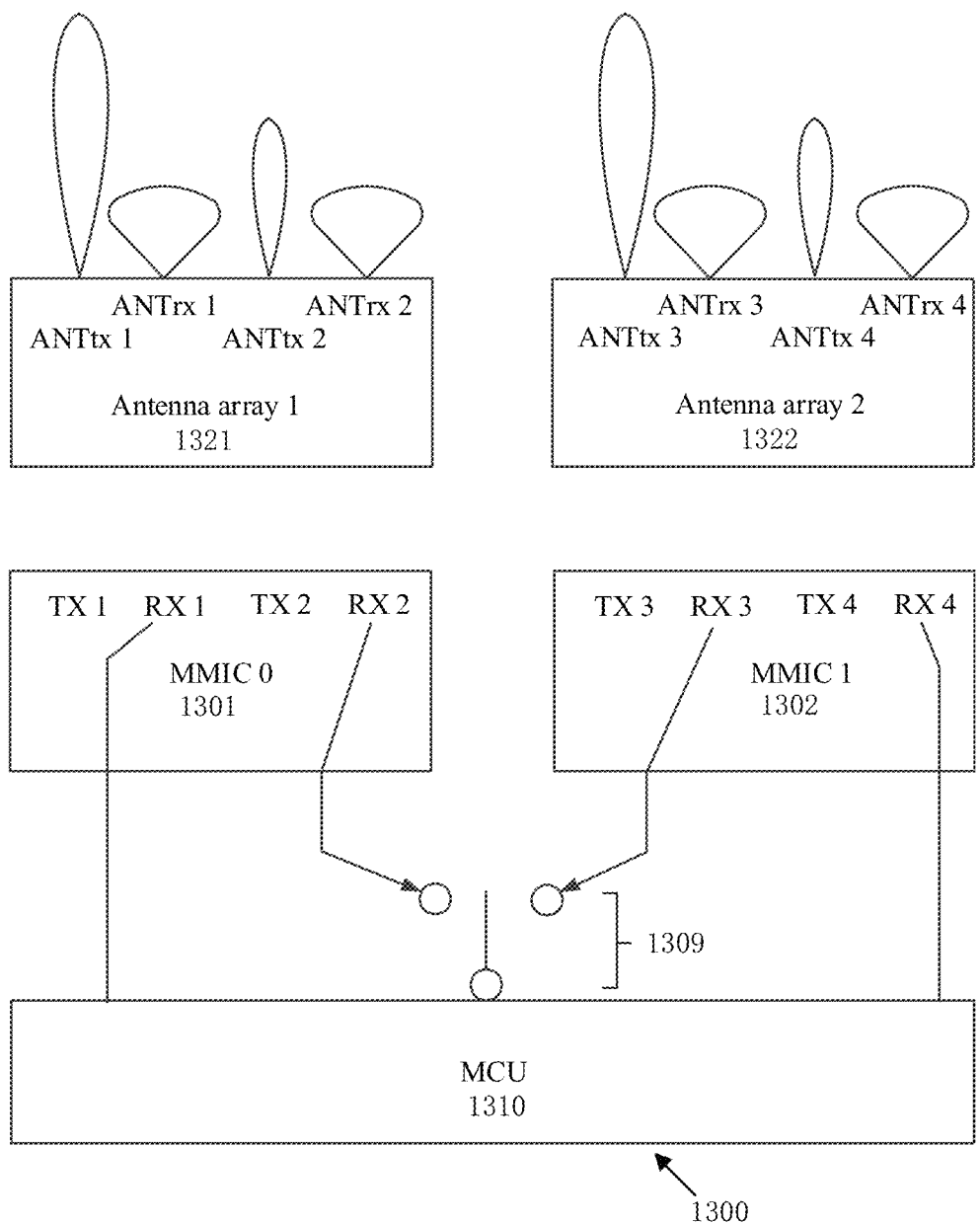
FIG. 13 is a diagram of an application scenario 3 of channel-level time division multiplexing according to an embodiment of this application.

For example, as shown in FIG. 13, a first radar module in a radar system is an MMIC 0 1301 and a second radar module in the radar system is an MMIC 1 1302. A digital signal of the MMIC 0 1301 and a digital signal of the MMIC 1 1302 are transmitted to an MCU 1310 in a channel-level time division multiplexing manner. There are two antenna arrays in the radar system 1300. The MMIC 0 1301 corresponds to an antenna array 1 1321. The antenna array 1 1321 includes a transmit antenna ANTtx 1 connected to a transmit channel TX 1 in the MMIC 0, an ANTtx 2 connected to a transmit channel TX 2 in the MMIC 0, a receive antenna ANTrx 1 connected to a receive channel RX 1 in the MMIC 0, and an ANTrx 2. The MMIC 1 1302 corresponds to an antenna array 2 1322. The antenna array 2 1322 includes transmit antennas ANTtx 3 and ANTtx 4 and receive antennas ANTrx 3 and ANTrx 4. Waveforms of the antenna arrays in the radar system have two modes. The ANTrx 1 and the ANTrx 4 are always operating. Both a signal obtained after the MMIC 0 1301 performs analog and digital conversion on a signal received by the ANTrx 1 and a signal obtained after the MMIC 1 1302 performs analog and digital conversion on a signal received by the ANTrx 4 are transmitted to the MCU 1310. A signal obtained after the MMIC 0 1301 performs analog and digital conversion on a signal received by the ANTrx 3 and a signal obtained after the MMIC 1 1302 performs analog and digital conversion on the signal received by the ANTrx 4 are transmitted to the MCU 1310 in the channel-level time division multiplexing manner. In other words, in a first mode, the ANTrx 1, the ANTrx 2, and the ANTrx 4 operate properly, and in a second mode, the ANTrx 1, the ANTrx 3, and the ANTrx 4 operate properly.

A scenario shown in FIG. 13 shows that one radar system includes two radar modules: the MMIC 0 1301 and the MMIC 1 1302, and the two radar modules separately correspond to different antenna arrays 1321 and 1322. In this way, flexibility in arrangement of the antenna arrays can be increased, to flexibly adapt to different algorithm and waveform solutions. In addition, receive channels in the radar system can partially multiplex an interface of the MCU 1310, so that MCU chips can be saved, and costs can be reduced.

Based on any one of the foregoing embodiments, the radar system in this embodiment of this application further includes a third radar module, and the third radar module includes at least one channel. The third radar module is electrically connected to the controller, or the at least one channel of the third radar module is electrically connected to the controller. When the third radar module is electrically connected to the controller, the third radar module, the first radar module, and the second radar module can implement partial time division multiplexing of the third interface of the controller. When the at least one channel of the third radar module is electrically connected to the controller, the third radar module, the first radar module, and the second radar module can implement partial time division multiplexing of the third interface of the controller.

In some other embodiments, in the radar system, the controller and the at least two radar modules may be connected in a plurality of manners. The following separately describes a direct connecting manner, an indirect connecting manner, and a manner combining direct connecting and indirect connecting. For details, refer to the following provided three implementations: an implementation C, an implementation D, and an implementation E.

In the implementation C, the controller is directly connected to the at least two radar modules. For example, the controller is directly connected to a first radar module and a second radar module. The first radar module and the second radar module implement time division multiplexing of the controller in digital domain. A first digital signal of the first radar module and a second digital signal of the second radar module are transmitted to the controller in a time division multiplexing manner. In the implementation C, statuses of interfaces of the first radar module and the second radar module may be controlled by logic to implement time division multiplexing.

In an implementation, the first radar module includes a first interface, the second radar module includes a second interface, and the controller includes a third interface, and digital signals of the first radar module and the second radar module are transmitted to the controller in a time division multiplexing manner. When the first radar module transmits a first digital signal to the third interface of the controller through the first interface, the second interface of the second radar module is in a high-impedance state; or when the second radar module transmits a second digital signal to the third interface of the controller through the second interface, the first interface is in a high-impedance state.

With reference to the possible implementation c, when the controller is directly connected to the at least two radar modules, how to transmit the first digital signal of the first radar module and the second digital signal of the second radar module to the controller in the time division multiplexing manner may be described based on different time division multiplexing manners. The following provides two implementations: an implementation C1 and an implementation C2.

In the implementation C1, a manner of the time division multiplexing is a module-level time division multiplexing manner, in other words, module-level time division multiplexing is implemented based on statuses of the interfaces of the radar modules. For a specific example, refer to FIG. 2 and descriptions of FIG. 2.

In the implementation C2, a manner of the time division multiplexing is a channel-level time division multiplexing manner, in other words, statuses of channel interfaces included in the interfaces of the radar modules are controlled by using logic, to implement module-level time division multiplexing.

In an implementation, when the first interface includes a plurality of channel interfaces, and the second interface includes a plurality of channel interfaces, when the first radar module is electrically connected to the third interface of the controller by using at least one channel interface in the first interface, all the channel interfaces in the second interface of the second radar module are in a high-impedance state; or when the first radar module is electrically connected to the third interface of the controller by using at least one channel interface in the first interface, some of the channel interfaces in the second interface of the second radar module are in a high-impedance state. Each channel interface in this application corresponds to each channel, and the channel in this application may correspond to a radio frequency channel or a baseband processing channel. This may be alternatively understood as follows: When the first radar module transmits the first digital signal to the third interface of the controller through at least one channel interface in the first interface, all the channel interfaces in the second interface of the second radar module are in a high-impedance state; or when the first radar module transmits the first digital signal to the third interface of the controller through at least one channel interface in the first interface, some of the channel interfaces in the second interface of the second radar module are in a high-impedance state. For specific descriptions of this implementation, refer to descriptions of related content in the implementation B1. Details are not described herein again.

For a specific example, refer to the example in the implementation B1, for example, FIG. 9, FIG. 10, and descriptions of FIG. 9 and FIG. 10. Details are not described herein again.

Optionally, when the first interface of the first radar module includes a plurality of channel interfaces, when the first radar module is electrically connected to the third interface of the controller by using a first part of the channel interfaces in the first interface, a second part of the channel interfaces in the first interface of the first radar module are in a high-impedance state. Each channel interface in this application corresponds to each channel, and the channel in this application may correspond to a radio frequency channel or a baseband processing channel. It can be learned that the first radar module can alternatively implement the channel-level time division multiplexing of the controller independently.

In the implementation D, the controller is indirectly connected to the at least two radar modules. For example, the controller is indirectly connected to a first radar module and a second radar module. A first digital signal of the first radar module and a second digital signal of the second radar module are transmitted to the controller in a time division multiplexing manner. In the implementation D, digital signals of the at least two radar modules may be controlled by a hardware module to be transmitted to the controller in a time division multiplexing manner.

In an implementation, the radar system further includes a transit module. The first radar module and the second radar module are separately connected to the controller by using the transit module to implement time division multiplexing. For example, the transit module may be a logic chip or a multiplexer.

With reference to the implementation D, when the controller is indirectly connected to the at least two radar modules, how the first radar module and the second radar module implement time division multiplexing of the controller in digital domain may be described based on different time division multiplexing manners. The following provides two implementations: an implementation D1 and an implementation D2.

In the implementation D1, a manner of the time division multiplexing is a module-level time division multiplexing manner.

In the implementation, when the first radar module is electrically connected to the controller by using the transit module, the second radar module is disconnected from the transit module; or when the second radar module is electrically connected to the controller by using the transit module, the first radar module is disconnected from the transit module.

In the implementation D2, a manner of the time division multiplexing is a channel-level time division multiplexing manner.

In the implementation, when the first radar module includes a plurality of channels, and the second radar module includes a plurality of channels, when at least one channel of the first radar module is electrically connected to the controller by using the transit module, all the channels of the second radar module are disconnected from the transit module; or when at least one channel of the first radar module is electrically connected to the controller by using the transit module, some of the channels of the second radar module are disconnected from the transit module; or when at least one channel of the first radar module is electrically connected to the controller by using the transit module, one part of the channels of the second radar module are disconnected from the transit module, and the one part of the channels of the second radar module are electrically connected to the controller. For specific descriptions of this implementation, refer to descriptions of related content in the implementation B2. Details are not described herein again.

For a specific example, refer to the example in the implementation B2, for example, FIG. 11, FIG. 12, and descriptions of FIG. 11 and FIG. 12. Details are not described herein again.

In the implementation E, the implementation C, and the implementation D are applied to the radar system in combination. When the controller is directly connected to one part of radar modules (or channels) in the at least two radar modules, and indirectly connected to the other part of radar modules (or channels) in the at least two radar modules, how the first digital signal of the first radar module and the second digital signal of the second radar module are transmitted to the controller in a time division multiplexing manner is described based on different time division multiplexing manners. The following provides an implementation E1 and an implementation E2.

In the implementation E1, the time division multiplexing is module-level time division multiplexing. The controller is directly connected to one part of the at least two radar modules, and indirectly connected to the other part of the at least two radar modules.

For example, the radar system includes a first radar module, a second radar module, and a third radar module. The first radar module and the second radar module are separately connected to the controller by using a transit module, to implement the time division multiplexing, and the third radar module is directly connected to the controller. For an implementation of direct connecting, refer to the implementation C1. For an implementation of indirect connecting, refer to the implementation D1. Details are not described herein again.

In the implementation E2, the time division multiplexing is channel-level time division multiplexing. The controller is directly connected to one part of all channels included in the at least two radar modules, and indirectly connected to the other part of all the channels included in the at least two radar modules. For an implementation of direct connecting, refer to the implementation C2. For an implementation of indirect connecting, refer to the implementation D2. Details are not described herein again.

In a implementation, the implementation C, the implementation D, and the implementation E may be applied to a radar system in which radar modules have different antenna arrays. For example, the radar system includes a first radar module and a second radar module. The radar system further includes a first antenna array corresponding to the first radar module and a second antenna array corresponding to the second radar module, so that digital signals of radar modules with different antenna arrays are transmitted to a controller in a time division multiplexing manner. The first radar module and the second radar module may be radar modules of a same type, or may be different radar modules.

In another implementation, the implementation C, the implementation D, and the implementation E may be alternatively applied to a radar system in which different radar modules have a same antenna array. For example, the radar system includes a first radar module and a second radar module. The radar system further includes a third antenna array, and the first radar module and the second radar module are separately connected to the third antenna array, so that digital signals of different radar modules with a same antenna array are transmitted to a controller in a time division multiplexing manner.

Based on any one of the foregoing embodiments, the radar system in this embodiment of this application further includes a third radar module, and the third radar module includes at least one channel. The third radar module is electrically connected to the controller, or the at least one channel of the third radar module is electrically connected to the controller. When the third radar module is electrically connected to the controller, the third radar module, the first radar module, and the second radar module can implement partial time division multiplexing of the third interface of the controller. When the at least one channel of the third radar module is electrically connected to the controller, the third radar module, the first radar module, and the second radar module can implement partial time division multiplexing of the third interface of the controller. The foregoing embodiments are described from a perspective of the radar module. The following provides descriptions from a perspective of the controller.

In an implementation, when a single radar module includes a plurality of channels, at a first moment, the controller may receive a first digital signal from a first part of the channels of the single radar module, and at a second moment, the controller may receive a second digital signal from a second part of the channels of the single radar module. The time division multiplexing may be implemented through the foregoing software control or hardware control. Descriptions of the software control or the hardware control are the same as the foregoing descriptions, and details are not described herein again. The first moment and the second moment are different moments. It can be learned that the different channels of the single radar module can implement time division multiplexing through the time division multiplexing in this embodiment of this application.

In an implementation, a plurality of radar modules implement time division multiplexing. The plurality of radar modules include a first radar module and a second radar module. At a first moment, the controller may receive a first digital signal from the first radar module, and at a second moment, the controller may receive a second digital signal from the second radar module. The first moment and the second moment are different moments. It can be learned that different radar modules can implement module-level time division multiplexing through the time division multiplexing in this embodiment of this application. The time division multiplexing may be implemented through the foregoing software control or hardware control. Descriptions of the software control or the hardware control are the same as the foregoing descriptions, and details are not described herein again.

Optionally, the plurality of radar modules further include a third radar module. When the first radar module includes a plurality of channels, the second radar module includes a plurality of channels, and the third radar module includes a plurality of channels, at a first moment, the controller may receive a first digital signal from all the channels of the first radar module and a first part of the channels of the third radar module, and at a second moment, the controller may receive a second digital signal from all the channels of the second radar module and a second part of the channels of the third radar module; or at a first moment, the controller may receive a first digital signal from a first part of the channels of the first radar module and a first part of the channels of the third radar module, and at a second moment, the controller may receive a second digital signal from a first part of the channels of the second radar module and a second part of the channels of the third radar module; or at a first moment, the controller may receive a first digital signal from a first part of the channels of the first radar module and a first part of the channels of the second radar module, and at a second moment, the controller may receive a second digital signal from a second part of the channels of the first radar module and a first part of the channels of the third radar module. The first part of the channels of the first radar module are partially the same as or totally different from the second part of the channels of the first radar module. The first moment and the second moment are different moments. The time division multiplexing may be implemented through the foregoing software control or hardware control. Descriptions of the software control or the hardware control are the same as the foregoing descriptions, and details are not described herein again. It can be learned that different radar modules can implement channel-level time division multiplexing through the time division multiplexing in this embodiment of this application.

It can be learned that the controller receives the first digital signal from a first channel set at the first moment, and receives the second digital signal from a second channel set at the second moment. Channels in the first channel set may include all or some of channels of a same radar module, or may include all or some of channels of a plurality of radar modules. Channels in the second channel set may include all or some of channels of a same radar module, or may include all or some of channels of a plurality of radar modules. The channels in the first channel set may be partially the same as or totally different from the channels in the second channel set. Therefore, different channels of the radar modules can be flexibly combined according to an actual requirement, to implement flexible time division multiplexing of the controller, so that a size, power consumption, and costs of the radar system are reduced.

The following further describes a specific implementation of this application from the perspective of the controller.

In an implementation F, the controller may receive digital signals transmitted by one radar module in a time division multiplexing manner. For example, the controller receives digital signals transmitted by a first radar module in a time division multiplexing manner. The following separately describes two cases: time division multiplexing implemented by using software and time division multiplexing implemented by using hardware.

Case 1: Channel-level time division multiplexing implemented by using software.

In an implementation, when a first interface of the first radar module includes a plurality of channel interfaces, when the first radar module is electrically connected to a third interface of the controller by using a first part of the channel interfaces in the first interface, a second part of the channel interfaces in the first interface of the first radar module are in a high-impedance state, and the controller receives a digital signal that is transmitted by the first radar module through the first part of the channel interfaces in the first interface; or when the first radar module is electrically connected to a third interface of the controller by using a second part of the channel interfaces in the first interface, a first part of the channel interfaces in the first interface of the first radar module are in a high-impedance state, and the controller receives a digital signal that is transmitted by the first radar module through the second part of the channel interfaces in the first interface. Therefore, the first radar module can implement channel-level time division multiplexing of the controller independently, in other words, a single radar module can implement channel-level time division multiplexing of the controller.

Case 2: Channel-level time division multiplexing implemented by using hardware.

In an implementation, when the first radar module includes a plurality of channels, when a first part of the channels of the first radar module are electrically connected to the controller by using a transit module, a second part of the channels of the first radar module are disconnected from the transit module, and the controller receives a digital signal that is transmitted by the first radar module through the first part of the channels; or when a second part of the channels of the first radar module are electrically connected to the controller by using a transit module, a first part of the channels of the first radar module are disconnected from the transit module, and the controller receives a digital signal that is transmitted by the first radar module through the second part of the channels. Therefore, the first radar module can implement channel-level time division multiplexing of the controller independently, in other words, a single radar module can implement channel-level time division multiplexing of the controller.

In an implementation G, the controller may receive digital signals transmitted by at least two radar modules in a time division multiplexing manner. The following separately describes four cases.

Case 1: Module-level time division multiplexing implemented by using software.

In an implementation, for example, the controller receives digital signals transmitted by a first radar module and a second radar module in a time division multiplexing manner. The first radar module includes a first interface, the second radar module includes a second interface, and the controller includes a third interface. When the first radar module is electrically connected to the third interface of the controller by using the first interface, and the second interface of the second radar module is in a high-impedance state, the controller receives a first digital signal that is transmitted by the first radar module through the first interface; or when the second radar module is electrically connected to the third interface of the controller by using the second interface, and the first interface is in a high-impedance state, the controller receives a second digital signal that is transmitted by the second radar module through the second interface. Therefore, the module-level time division multiplexing of the controller can be implemented by controlling statuses of the interfaces of the first radar module and the second radar module. When the first radar module or the second radar module is a chip, the module-level time division multiplexing may also be referred to as chip-level time division multiplexing.

In another implementation, for example, the controller receives digital signals transmitted by a first radar module, a second radar module, and a third radar module in a time division multiplexing manner. The first radar module includes a first interface, the second radar module includes a second interface, the third radar module includes a fourth interface, and the controller includes a third interface. When any radar chip in the first radar module, the second radar module, and the third radar module transmits a digital signal to the controller through an interface of the radar chip, interfaces of the other radar modules are in a high-impedance state. For example, within a first time unit, when the first radar module transmits a digital signal to the controller through the first interface, the second interface of the second radar module and the fourth interface of the third radar module are in a high-impedance state, and the controller receives the digital signal that is transmitted by the first radar module through the first interface; and within a second time unit, when the second radar module transmits a digital signal to the controller through the second interface, the first interface of the first radar module and the fourth interface of the third radar module are in a high-impedance state, and the controller receives the digital signal that is transmitted by the second radar module through the second interface.

Case 2: Module-level time division multiplexing implemented by using hardware.

In an implementation, when a first radar module is electrically connected to the controller by using a transit module, a second radar module is disconnected from the transit module, and the controller receives a first digital signal that is transmitted by the first radar module by using the transit module; or when a second radar module is electrically connected to the controller by using a transit module, a first radar module is disconnected from the transit module, and the controller receives a second digital signal that is transmitted by the second radar module by using the transit module. Therefore, module-level time division multiplexing of the controller is implemented by using the transit module.

In another implementation, for example, the controller receives digital signals transmitted by a first radar module, a second radar module, and a third radar module in a time division multiplexing manner. When any radar chip in the first radar module, the second radar module, and the third radar module is electrically connected to the controller by using a transit module, all other radar modules are disconnected from the transit module. For example, within a first time unit, when the first radar module is electrically connected to the controller by using the transit module, both the second radar module and the third radar module are disconnected from the transit module, and the controller receives a first digital signal that is transmitted by the first radar module by using the transit module; and within a second time unit, when the third radar module is electrically connected to the controller by using the transit module, both the first radar module and the second radar module are disconnected from the transit module, and the controller receives a first digital signal that is transmitted by the third radar module by using the transit module.

Case 3: Channel-level time division multiplexing implemented by using software.

In an implementation, when a first interface of a first radar module includes a plurality of channel interfaces, and a second interface of a second radar module includes a plurality of channel interfaces, when the first radar module is electrically connected to a third interface of the controller by using at least one channel interface in the first interface, all the channel interfaces in the second interface of the second radar module are in a high-impedance state, and the controller receives a first digital signal that is transmitted by the first radar module through the at least one channel interface in the first interface; or when the first radar module is electrically connected to a third interface of the controller by using at least one channel interface in the first interface, some of the channel interfaces in the second interface of the second radar module are in a high-impedance state, and the controller receives a first digital signal that is transmitted by the first radar module through the at least one channel interface in the first interface, and a second digital signal that is transmitted by the second radar module through some of the channel interfaces in the second interface. Each channel interface in this application corresponds to each channel, and the channel in this application may correspond to a radio frequency channel or a baseband processing channel. It can be learned that in this implementation solution, statuses of all the channel interfaces of the first radar module and statuses of all the channel interfaces of the second radar module are controlled by using software, to implement channel-level time division multiplexing of the controller.

In another implementation, for example, the controller receives digital signals transmitted by a first radar module, a second radar module, and a third radar module in a time division multiplexing manner. When any one of the first radar module, the second radar module, and the third radar module is electrically connected to a third interface of the controller by using at least one channel interface of an included interface, all channel interfaces in interfaces of other radar modules are in a high-impedance state, and the controller receives a digital signal that is transmitted by the any radar module through the at least one channel interface in the included interface; or when any one of the first radar module, the second radar module, and the third radar module is electrically connected to a third interface of the controller by using at least one channel interface of an included interface, one part of channel interfaces in interfaces included in other radar modules are in a high-impedance state, in other words, the other part of the channel interfaces in the interfaces included in the other radar modules are electrically connected to the third interface of the controller, and the controller receives a digital signal that is transmitted by the any radar module through the at least one channel interface in the included interface, and digital signals that are transmitted by the other radar modules through the other part of the channel interfaces in the included interfaces.

Case 4: Channel-level time division multiplexing implemented by using hardware.

In an implementation, when a first radar module includes a plurality of channels and a second radar module includes a plurality of channels, when at least one channel of the first radar module is electrically connected to the controller by using a transit module, all the channels of the second radar module are disconnected from the transit module, and the controller receives a digital signal that is transmitted by the at least one channel of the first radar module by using the transit module; or when at least one channel of the first radar module is electrically connected to the controller by using a transit module, one part of the channels of the second radar module are disconnected from the transit module, in other words, the other part of the channels of the second radar module are electrically connected to the controller by using the transit module, and the controller receives a digital signal that is transmitted by the at least one channel of the first radar module by using the transit module, and digital signals that are transmitted by the other part of the channels of the second radar module by using the transit module; or when at least one channel of the first radar module is electrically connected to the controller by using a transit module, one part of the channels of the second radar module are disconnected from the transit module, and the one part of the channels of the second radar module are electrically connected to the controller, and in this case, the controller receives a digital signal that is transmitted by the at least one channel of the first radar module by using the transit module, and digital signals that are directly transmitted by the one part of the channels of the second radar module. Therefore, some or all of the channels of the first radar module and some or all of the channels of the second radar module can be separately connected to or disconnected from the controller by using the transit module, to implement channel-level time division multiplexing of the controller through hardware control. The channel in this application may correspond to a radio frequency channel or a baseband processing channel.

In an implementation, the transit module is a logic chip or a multiplexer. Therefore, a module-level or channel-level time division multiplexing solution can be flexibly implemented. If the transit module is a logic chip, switchover between a plurality of modes can be supported, and the time division multiplexing solution can be implemented more flexibly. If the transit module is a multiplexer, more costs can be reduced.

In another implementation, a radar system includes at least three radar modules. Each radar module includes a plurality of channels. When at least one channel of a first radar module is electrically connected to the controller by using a transit module, all channels of other radar modules are disconnected from the transit module, and the controller receives a digital signal that is transmitted by the at least one channel of the first radar module by using the transit module; or when at least one channel of a first radar module is electrically connected to the controller by using a transit module, one part of channels of other one or more radar modules are disconnected from the transit module, in other words, the other part of the channels of the other one or more radar modules are electrically connected to the controller by using the transit module, and the controller receives a digital signal that is transmitted by the at least one channel of the first radar module by using the transit module, and digital signals that are transmitted by the other part of the channels of the other one or more radar modules by using the transit module; or when at least one channel of a first radar module is electrically connected to the controller by using a transit module, one part of channels of other one or more radar modules are disconnected from the transit module, and the one part of the channels of the other one or more radar modules are electrically connected to the controller, and in this case, the controller receives a digital signal that is transmitted by the at least one channel of the first radar module by using the transit module, and digital signals that are directly transmitted by the one part of the channels of the other one or more radar modules. Therefore, some or all of the channels of the radar modules are controlled, by hardware by using the transit module, to be separately connected to or disconnected from the controller, to implement channel-level time division multiplexing of the controller. The channel in this application may correspond to a radio frequency channel or a baseband processing channel.

Based on a same inventive concept, an embodiment of this application further provides a terminal device. The terminal device may be a vehicle or a vehicle-mounted device in a vehicle. The terminal device includes the radar system provided in the foregoing embodiments. The radar system included in the terminal device may provide more transmit channels, more receive channels, and a larger antenna array size, so that a maximum detection distance, an unambiguous angle range, and angular resolution can be increased, flexible arrangement of an antenna array and optimization of a signal processing system solution are made possible, and cabling complexity and an insertion loss of a feeder connecting an antenna to the radar module can be reduced. In this way, performance of the radar system is improved, a size, power consumption, costs, and the like of the system are reduced, and performance of the terminal device can be improved.

It should be noted that in this application, the "vehicle" may include one or more different types of transportation, and may also include one or more different types of transportation tools or movable objects that operate or move on land (for example, a highway, a road, or a railway), water surface (for example, a waterway, a river, or an ocean), or in space. For example, the vehicle may include a car, a bicycle, a motorcycle, a train, a subway, an airplane, a ship, an aircraft, and/or another type of transportation tool or movable object.

The foregoing descriptions are merely specific embodiments of the present disclosure, but are not intended to limit the protection scope of the present disclosure. Any variation or replacement readily figured out by a person skilled in the art within the technical scope disclosed in the present disclosure shall fall within the protection scope of the present disclosure. Therefore, the protection scope of the present disclosure shall be subject to the protection scope of the claims.

What is claimed is:

1. A radar system, comprising:
a controller; and
a first radar Rx module and a second radar Rx module connected to the controller;
the controller processes a first digital radar signal from the first radar Rx module or a second digital radar signal from the second radar Rx module;
the first radar Rx module and the second radar Rx module communicate with the controller in a time division manner in a digital domain; and
when the first digital radar signal from the first radar Rx module is selected for processing, the second radar Rx module is put into a high impedance state, and when the second digital radar signal from the second radar Rx module is selected for processing, the first radar Rx module is put into the high impedance state.

2. The radar system according to claim 1, wherein the first radar Rx module comprises a first interface, the second radar Rx module comprises a second interface, and the controller comprises a third interface; and
when the first radar Rx module is electrically connected to the third interface of the controller using the first interface, the second interface of the second radar Rx module is in a high-impedance state.

3. The radar system according to claim 1, wherein the radar system further comprises a transit circuitry, and the first radar Rx module and the second radar Rx module are separately connected to the controller using the transit circuitry to implement the time division multiplexing.

4. The radar system according to claim 1, wherein the time division multiplexing is module-level time division multiplexing.

5. The radar system according to claim 3, wherein when the first radar Rx module is electrically connected to the controller using the transit circuitry, the second radar Rx module is disconnected from the transit circuitry.

6. The radar system according to claim 1, wherein the time division multiplexing is channel-level time division multiplexing.

7. The radar system according to claim 3, wherein the first radar Rx module comprises a plurality of first channels and the second radar Rx module comprises a plurality of second channels, the radar system further comprising:
when at least one channel of the first radar Rx module is electrically connected to the controller using the transit circuitry, all the second channels of the second radar Rx module are disconnected from the transit circuitry; or
when at least one first channel of the first radar Rx module is electrically connected to the controller using the transit circuitry, some of the second channels of the second radar Rx module are disconnected from the transit circuitry; or when the at least one first channel of the first radar Rx module is electrically connected to the controller using the transit circuitry, one part of the second channels of the second radar Rx module are disconnected from the transit circuitry, and the one part of the second channels of the second radar Rx module are electrically connected to the controller.

8. The radar system according to claim 2, wherein the first interface comprises a plurality of first channel interfaces and the second interface comprises a plurality of second channel interfaces, the radar system further comprising:

when the first radar Rx module is electrically connected to the third interface of the controller using at least one first channel interface in the first interface, all the second channel interfaces in the second interface of the second radar Rx module are in a high-impedance state; or when the first radar Rx module is electrically connected to the third interface of the controller using at least one first channel interface in the first interface, some of the second channel interfaces in the second interface of the second radar Rx module are in a high-impedance state.

9. The radar system according to claim 3, wherein the transit circuitry is a logic chip or a multiplexer.

10. The radar system according to claim 1, wherein the radar system further comprises a first antenna array and a second antenna array, the first antenna array corresponding to the first radar Rx module and the second antenna array corresponding to the second radar Rx module.

11. The radar system according to claim 1, wherein the radar system further comprises a third antenna array, and the first radar Rx module and the second radar Rx module are separately connected to the third antenna array.

12. The radar system according to claim 1, wherein the first radar Rx module and the second radar Rx module are different radar Rx modules.

13. The radar system according to claim 1, wherein the radar system further comprises a third radar Rx module, and the third radar Rx module comprises at least one third channel; and the third radar Rx module is electrically connected to the controller; or the at least one third channel of the third radar Rx module is electrically connected to the controller.

14. The radar system according to claim 1, wherein the third interface of the controller is an LVDS interface or a MIPI interface.

15. The radar system according to claim 1, wherein the radar system is a vehicle-mounted radar system.

16. A terminal device, comprising:
a controller; and
a first radar Rx module and a second radar Rx module connected to the controller;
the controller processing a first digital radar signal from the first radar Rx module or a second digital radar signal from the second radar Rx module;
the first radar Rx module and the second radar Rx module communicate with the controller in a time division manner in a digital domain; and
when the first digital radar signal from the first radar Rx module is selected for processing, the second radar Rx module is put into a high impedance state, and when the second digital radar signal from the second radar Rx module is selected for processing, the first radar Rx module is put into the high impedance state.

17. The terminal device according to claim 16, wherein the first radar Rx module comprises a first interface, the second radar Rx module comprises a second interface, and the controller comprises a third interface; and when the first radar Rx module is electrically connected to the third interface of the controller using the first interface, the second interface of the second radar Rx module is in a high-impedance state.

18. The radar system according to claim 16, wherein the radar system further comprises a transit circuitry, and the first radar Rx module and the second radar Rx module are separately connected to the controller using the transit circuitry to implement the time division multiplexing.

19. The terminal device according to claim 16, wherein the time division multiplexing is module-level time division multiplexing.

20. The terminal device according to claim 18, wherein when the first radar Rx module is electrically connected to the controller using the transit circuitry, the second radar Rx module is disconnected from the transit circuitry.

21. The terminal device according to claim 16, wherein the time division multiplexing is channel-level time division multiplexing.

22. The terminal device according to claim 18, wherein the first radar Rx module comprises a plurality of first channels and the second radar Rx module comprises a plurality of second channels, the terminal device further comprising:

when at least one first channel of the first radar Rx module is electrically connected to the controller using the transit circuitry, all the second channels of the second radar Rx module are disconnected from the transit circuitry; or when at least one first channel of the first radar Rx module is electrically connected to the controller using the transit circuitry, some of the second channels of the second radar Rx module are disconnected from the transit circuitry; or when at least one first channel of the first radar Rx module is electrically connected to the controller using the transit circuitry, one part of the second channels of the second radar Rx module are disconnected from the transit circuitry, and the one part of the second channels of the second radar Rx module are electrically connected to the controller.

23. The terminal device according to claim 17, wherein the first interface comprises a plurality of first channel interfaces and the second interface comprises a plurality of second channel interfaces, the terminal device further comprising:

when the first radar Rx module is electrically connected to the third interface of the controller using at least one first channel interface in the first interface, all the second channel interfaces in the second interface of the second radar Rx module are in a high-impedance state; or when the first radar Rx module is electrically connected to the third interface of the controller using at least one channel interface in the first interface, some of the second' channel interfaces in the second interface of the second radar Rx module are in a high-impedance state.

24. The terminal device according to claim 18, wherein the transit circuitry is a logic chip or a multiplexer.

25. The terminal device according to claim 16, wherein the radar system further comprises a first antenna array and a second antenna array, the first antenna array corresponding to the first radar Rx module and the second antenna array corresponding to the second radar Rx module.

26. The terminal device according to claim 16, wherein the radar system further comprises a third antenna array, and the first radar Rx module and the second radar Rx module are separately connected to the third antenna array.

27. The terminal device according to claim 16, wherein the first radar Rx module and the second radar Rx module are different radar Rx modules.

28. The terminal device according to claim 16, wherein the radar system further comprises a third radar Rx module, and the third radar Rx module comprises at least one third channel; and the third radar Rx module is electrically connected to the controller; or the at least one third channel of the third radar Rx module is electrically connected to the controller.

29. The terminal device according to claim 16, wherein the third interface of the controller is an LVDS interface or a MIPI interface.

30. The terminal device, according to claim 16, the terminal device is a vehicle.

\* \* \* \* \*